(12) United States Patent
Orr et al.

(10) Patent No.: US 6,212,824 B1
(45) Date of Patent: Apr. 10, 2001

(54) METHODS FOR CLASSIFYING PLANTS FOR EVALUATION AND BREEDING PROGRAMS BY USE OF REMOTE SENSING AND IMAGE ANALYSIS TECHNOLOGY

(75) Inventors: Peter M. Orr, Thompson, CT (US); David C. Warner, Charlestown, RI (US); James V. O'Brien, Mystic, CT (US); G. Richard Johnson, Urbana, IL (US)

(73) Assignee: Dekalb Genetics Corporation, Dekalb, IL (US)

(*) Notice: Subject to any disclaimer, the term of this patent is extended or adjusted under 35 U.S.C. 154(b) by 0 days.

(21) Appl. No.: 08/449,892

(22) Filed: May 23, 1995

Related U.S. Application Data

(63) Continuation of application No. 08/164,622, filed on Dec. 7, 1993, which is a continuation of application No. 07/779,182, filed on Dec. 18, 1991, now abandoned.

(51) Int. Cl.[7] .............................. A01H 1/04; G01B 11/00; G01B 15/00; G01C 11/00; G03B 37/00; G06K 9/00

(52) U.S. Cl. .......................... 47/58; 47/1.01; 47/DIG. 1; 364/413.01; 364/420; 364/506; 364/551.01; 364/557; 364/560; 382/100; 382/108; 382/110; 382/128; 382/165; 382/181; 382/312; 382/313; 209/576; 209/577; 209/578; 209/580; 209/581; 800/200; 800/DIG. 26; 800/DIG. 55; 800/DIG. 56; 435/412; 435/413; 435/418

(58) Field of Search ................... 47/58, 1.01, DIG. 1; 364/420, 506, 551.01, 557, 560, 413.01; 382/100, 108, 110, 128, 165, 181, 312, 313; 209/576, 577, 578, 580, 581; 800/200, DIG. 26, DIG. 55, DIG. 56; 435/412, 413, 418

(56) References Cited

PUBLICATIONS

Blum et al. 1982. Field Crops Research 5(2): 137–146.*
Gardner et al. 1981. Agronomy Journal 73(4): 743–747.*
Oka et al. 1980. Japan J. Breed. 38:449–458.*
Ekanayake et al. 1985. Crop Science 25:927–933.*

* cited by examiner

*Primary Examiner*—David T. Fox
(74) *Attorney, Agent, or Firm*—Arnold, White & Durkee

(57) ABSTRACT

Methods for classifying plants by remote sensing and image analysis technology are presented. These methods are useful for evaluating plants and for selecting plants for a plant breeding program which has as its goal to selectively alter phenotype. The methods combine the newer techniques of remote sensing technology to obtain indirect correlates of the traits of interest, with classical pedigree breeding strategies. Thermal and infrared reflectance measures of plant canopies are examples of energy values measured by remote sensing, used to indirectly predict the selected traits.

51 Claims, 9 Drawing Sheets

(7 of 9 Drawing Sheet(s) Filed in Color)

METHODS FOR CLASSIFYING PLANTS FOR EVALUATION AND BREEDING PROGRAMS BY USE OF REMOTE SENSING AND IMAGE ANALYSIS TECHNOLOGY

This application is a continuation of prior application Ser. No. 08/164,622, filed Dec. 7, 1993, currently pending, which was a file wrapper continuation of Ser. No. 07/779,182, filed Dec. 18, 1991, now abandoned.

BACKGROUND OF THE INVENTION

1. Field of the Invention

Plants are classified for evaluation and breeding programs by using remote sensing and image analysis technology. Responses of plant genotypes to environmental variation are determined, and those responses are used to predict the values of commercially useful phenotypic traits resulting from essentially similar genotypic-environmental interactions. Plants selected are for subsequent advancement, manipulations and/or further breeding to improve the trait by altering the gene pool of the plant population.

2. Description of the Related Art
A. Remote Sensing Technology Applied to Plants In the broad context, remote sensing refers to the capability of obtaining information about an object without touching it. Sensors which are not in direct contact with the object are generally used to obtain the information. In a more limited context, the information obtained by remote sensing is a function of energy emitted by, absorbed by, or reflected from the object.

General principals of remote sensing technology as expressed in methods and apparati, have been applied to collect data on plants. Plant pathologists were among the first to use color infrared photography for remote sensing. A major objective of these early workers was to assess the presence of diseases in trees. Hand held sensors have been used to obtain measures on individual plants, for example, to measure temperature, but these are tedious to use and results are biased due to small samples. One person using a hand gun could perhaps scan 200 plants per day. Concurrent or simultaneous measurements on many plants are not possible, therefore, temporal and spatial variation obscures the basic plant data.

At the other end of the remote sensing distance scale, satellite images of cultivated fields or wild foliage have been produced. The satellite scanning has included crop inventory and acreage estimates. Problems in satellite scanning include low resolution and inadequate area coverage. Clouds and intermittent temporal sampling are also problems in the quality of data obtained in this manner. The distance from which data is obtained by remote sensing varies from inches when a hand held sensor is used, to miles when satellite borne sensors are used. Satellite sensing is not capable of distinguishing among measures of plants of the same species planted in close proximity, e.g., in rows of a-subplot of a field.

Generally, methods employing remote sensing have been applied to assessing the health of individual plants or small groups of plants, or to make assessments of crops on a large scale. Environmental variables such as acreage conditions and soil type have also been determined by remote sensing.

Present progress in applying remote sensing technology to agriculture was summarized at the Beltsville Symposium XV (1990). Related reports have been recently published (1991). The following summary of this research area is based on this publication and on related works.

Previous work has described obtaining remote sensing data on plants and soil from aerial surveillance e.g., satellites, planes, helicopters (Everitt et al., 1990; Williams, 1991; Schmugge et al., 1991; Sequin et al., 1991).

The purposes for obtaining plant data by remote sensing have varied. Most often, global parameters were sought. For example, Sequin et al. (1991) assessed regional crop water conditions using thermal infrared data obtained by satellite and discussed interpretive problems in making those large scale correlations. A number of investigations address how the earth's land-surface vegetation and atmospheric boundary layer interact to affect weather and climate. According to Hall et al. (1991) many problems need to be solved to reach this goal.

Generally, measurements made by remote sensing are physiologically directly or indirectly related to a parameter of interest; e.g., shrinking and swelling of leaf discs or rolling of leaves was found to indicate tissue water status (Spomer and Smith, 1989).

Attempts have been made to forecast crop yield from agricultural regions obtained by remote sensing from satellites. Grain sorghum yield was compared to color infrared film response as measured with a video input image analysis system (Wiegand and Miller, 1987).

Other goals of remote sensing of plants have included documentation of weed or insect infestation, monitoring of water conditions (Everitt et al., 1990; Zhang and Brusewitz, 1990), and detection of crop stress (Stevens et al., 1990).

Little remote sensing has been done in the intermediate range between individual plants and large-area crop conditions. Problems in satellite imaging preclude use of this type of surveillance for detection of plant parameters for small areas; e.g., crop testing subplots or for taking refined quantitative measures (Gutman, 1991; Sequin et al., 1991). Measurement by hand held sensors is not commercially feasible.

Rather than determining plant parameters for their own sake, some studies merely wish to distinguish among species or among types within a species, by remote sensing patterns (Williams, 1991).

Attempts have been made to describe, and in some cases, distinguish among genotypes, by remote sensing measurements (Dhillion et al., 1990; Valdes et al., 1987; 1990; Loffler and Busch, 1983).

Remote sensing data has been reduced to various vegetation indices in efforts to improve analysis (Wiegand et al., 1991; Baret and Guyot, 1991) discuss the potential and limitations of different vegetation indices).

B. Breeding and Evaluation Programs to Improve Plants

Attempts to improve commercially important traits in plants, for example, grain yield in corn and wheat, have consumed the energies of commercial plant breeders in the 1900's. Clever and sophisticated breeding schemes have been devised, yet the rate of improvement of economically important characters has been only a few to several percent of the mean per year for the past several decades. For various crop plants, it has been established that roughly half of this improvement is due to improved husbandry practices, i.e., environmental effects rather than genetic changes effected by selection. (Lande and Thompson, 1990).

The record available from the crude crop breeding programs of the late 1800's through the ever more sophisticated programs leading to the present is littered with dead ends—failures, for one reason or another. For example, data on the ineffectiveness of mass selection for several corn ear characters as presented by Williams and Welton in 1915 are reproduced and discussed by Sprague and Eberhart (1977).

Selection for long and short ears was not effective in separating the population into two distinct subpopulations defined by ear length. Yield, one of the most commercially valuable traits, has been the least responsive to selective breeding programs. Selection from 1907–1914 had no overall effect on yield. An examination of data on corn yield trials published by experiment stations in Illinois from 1860 to 1900 shows that many corn varieties were included for short test periods, then discarded because of poor yielding ability. (Sprague and Eberhart, 1977). This article refers to a report that visual selection practiced during inbreeding had little, if any, direct influence on yield in hybrid combinations. However, selection was effective for some other traits, e.g., maturity. Recurrent selection was somewhat more effective in improving breeding populations.

These failures to substantially alter plant characteristics are costly. Even the successes with recurrent selection may generally be described as incremental and long range improvements rather than mercurial saltatory jumps. Divergence of corn varieties for oil and protein content of grain was achieved if results over the 70 year history of a long-term experiment in Illinois are considered. However, improvement in yield has been less dramatic. Over the past 60 years, increases in yield due to genetic improvement have averaged only about one bushel/acre/year (Hallauer, et al., 1988, p. 466). Only a small population of hybrid plants produced commercially ever show enough improvement to be worth marketing. World-wide needs for plant derived food, both for animals and humans, warrant improved strategies. Plants are also finding uses in non-food products necessitating increased production. New methods are necessary for more efficient and successful plant breeding programs than are currently available.

Molecular genetic techniques are now available for incorporation with classical pedigree-based plant breeding schemes (see discussion in Nienhuis, et al., 1987). The detection and derivation of restriction fragment length polymorphisms (RFLPs) has been useful to develop markers in plants and to determine their associations with quantitative trait loci (QTL) (e.g., in tomatoes, Nienhuis, et al., 1987). Costs of these strategies have been explored by Beckman and Soller (1983). RFLPs were first used as markers in human genetics and since then have been widely applied, in particular, as diagnostic tools to detect genetic disease (Botstein, et al., 1980). One method proposed for integrating molecular genetics with artificial selection for plants and animals is known as marker-assisted selection (MAS) (Lande and Thompson, 1990). For this method of selection, phenotypic trait information is combined with molecular information and is predicted to be more effective than selection based on purely phenotypic selection of the traits of commercial interest, the classical approach.

C. Remote Sensing Technology Applied to Plant Breeding Programs

The related art uses apparatus and basic methods developed for remote sensing, to measure plant variables, notably canopy temperature and multispectral reflectances. However, whatever success has been achieved by others in the past appears to be in distinguishing among land-based objects on a broad, somewhat crude basis, e.g. discrimination among crop types, assessing the condition of acreage. This global assessment has been done mostly by satellites.

With regard to short distance scanning, hand held sensors may be used, e.g., to measure leaf temperature. A leaf or canopy under full irrigation will be cooler than air. As water becomes more limiting, leaf or canopy temperature moves closer to air temperature. Under severe stress, leaf or canopy temperature will exceed air temperature. Calculating the difference between air and leaf temperature is useful to express energy balance in this fashion but air temperature changes during the course of measurement of plot areas, making interpretation of data tenuous due to temporal variation. Remote sensing of large areas, quickly would eliminate this limitation of the method.

One of the challenges of applying new remote sensing technologies to breeding programs designed to improve crops, is how a given measurement of a trait or screening technology may be applied to evaluations of plants growing in fields. The present invention accomplishes the integration of scattered components of remote sensing technology and classic selective breeding strategies to create a method for plant crop improvement. The methods disclosed herein permit high throughput of remote sensing values obtained simultaneously from many plants. Fine resolution to the level of e.g. rows in subplots of fields in which plants are growing, is possible.

Qualitative rather than quantitative assessments have characterized previous agricultural applications of remote sensing. The present invention provides more refined and extensive quantitative measures in plant subplots and in areas within subplots for a novel purpose, e.g. genetic selection and/or identification for breeding and evaluation programs to improve crops. Wide area adaptability of plants (performance predictability, hybrid stability) may be determined.

SUMMARY OF THE INVENTION

The present invention employs remote sensing technology to classify inbred and hybrid plants and segregating populations for commercially important traits such as yield, environmental stress responses, disease resistance, insect and herbicide resistance, and drought resistance. Images are prepared from remote sensing data obtained from plants. Images are presentations of energy values of plants which may take the form of photographs, video output, electronic signals, digital output, or any other suitable means of captures of the values. Plants are classified and evaluated on the basis of the values of the remote sensing data, either directly or indirectly by correlations with other variables. Classification refers to determining the value of a trait relative to distribution of values the trait may assume, delineating classes within the distribution by setting upper and lower limits of values for the class, and assigning the plant to a class based on the plant's values. More than one trait or combination of traits may be used. Classes are defined according to the goal of an evaluation or a breeding program.

These evaluations are useful in decision making to select plants from early generations or preliminary tests used in breeding, to be advanced for selective breeding. Advancement refers to moving plants to further, generally more refined breeding trials. Selection of plants for advancement is generally based on superior performance of the trait to be improved. The actual response to selection will depend on the heritability of the selected trait. For example, some types of herbicide resistance which appear to be due to the effect of a single gene are little affected by environmental influences and will be likely to show quick response to selection. All traits will respond to selection in proportion to their heritabilities.

Advantages of the present invention over traditional hybrid trials include earlier and more rapid plant evaluation at an earlier stage in development and at earlier generations, reducing costs and time involved by improving selection for subsequent breeding. Remote sensing screening provides improved evaluation tools at steps where breeders must make decisions, providing decision making criteria not previously available to the plant breeder.

Another advantage of these methods is that certain traits may be assessed indirectly earlier, cheaper or more efficiently than by direct measurements. Indirect measurements add, when combined with direct measurements, to the power of assessment of hybrid predictability.

Wide area adaptability of genotypes is readily determined by the methods of the present invention. Performance of the same genotype in different environments is facilitated. Environmental variation may be generated within adjacent subplots by varying water levels, for example. Alternatively, performance may be evaluated of plants growing in fields at different locations. If simultaneous scanning is desired for the latter, multiple planes may be used for remote sensing by aerial surveillance, and scanning times may be coordinated.

Steps in an embodiment of the methods of the present invention may be summarized as follows:

1. Simultaneously collect remote sensing data in the form of an image on a first set of phenotypic traits from a group of plant genotypes of the same species generally from relatively small geographical areas, in particular, subplots of land in which plants are growing (although simultaneous remote sensing of plants growing in artificial environments is also within the scope of this invention).

In some cases, one may wish to obtain information on the environment (E) in which the plants are growing so that the genotypic effects (G) can be separated from the total phenotype (P) where (P=G+E).

2. Develop a descriptor by performing operations on the raw data obtained by remote sensing.

3. Use the descriptor to classify the plants; the descriptor may also be used to predict values for a second set of commercially valuable traits.

Values for a second set of phenotypic traits on the same plant genotypes expressed in the same environment or even different environments may be determined; the second set of traits need not be determined by remote sensing, and advantageously include a trait that is expressed later in time than when remote sensing is performed. These predictions may be used to discriminate among performance of different genotypes and to assess and compare response of different genotypes to the same environmental conditions or the response of the same genotypes to different environments.

An aspect, therefore, of the present invention is to measure a first set of plant phenotypic traits by remote sensing technology, and to use these traits; e.g., canopy temperature, color infrared reflectance, as predictors of important commercial traits such as yield and drought resistance for which direct measures can only be made later in the temporal plant developmental stage, or which are more expensive or more difficult to make directly.

Combinations of remote sensing technological procedures; e.g. aerial thermal and multispectral data collection, and image enhancement, are applied in particular to subplots of fields to detect genotypic differences in response to the environment.

Aerial remote sensing is preferred to ground measurements to obtain data on energy levels of plants growing in small areas of fields. Soil and vegetation have unique spectral characteristics (i.e. reflection, transmission, and absorption of light) that enable very accurate separation when using multiple bands of energy. The different behavior of soil and vegetation allow for computer enhancement and removal of soil background and shadows. In addition, these bands of reflectance are less affected by environmental fluctuation than thermal bands. Also since multiple bands are generally used and resulting calculations can be based on multiple bands, these values are preferred for cross referencing of responses. This feature predicts increased utility of multiple band (multispectral) remote sensing techniques over thermal imagery. One means by which to collect reflectance for these bands is through High Resolution Color Infrared (CIR) Photography. Remote sensing of plants growing in artificial environments such as greenhouses or growth chambers, is also within the scope of this invention.

Genotypes that confer desirable phenotypic expressions in certain environments are thereby selected for subsequent plant breeding programs and/or commercial sale without the necessity for direct phenotypic assessment, for example, of yield at harvest.

In an illustrative embodiment, measurements are made on target plants growing in fields. The measurements of plant variables are generally obtained from a plurality of plants, generally from a canopy, but may be made on individual plants. A canopy is a composite of the leaves of plants growing in a field. Canopy temperature differences are one of the variables found to be useful in making comparisons of plant germplasm responses to environmental conditions. Canopy spectral qualities are in effect "signatures" of the genotypes interacting in a particular environment. Thermal values are predictive of variables such as photosynthetic activity of the plants, morphological responses of plants to the environment, e.g., leaf rolling, and water status.

The methods of the present invention are applicable to any plant which has structural features that are accessible to measurements by remote sensing. Preferably the structural features are leaves, although other structures are also suitable if measurements of their characteristics are measurable by remote sensing and are either of interest themselves or are correlated to a second set of phenotypic traits for which selective breeding is desired.

Techniques disclosed herein are suitable for any type of plants for which plant improvements by human breeding programs are major goals and in particular for agronomic and horticultural crop plants that possess traits that may be detected by remote sensing technology and for which breeding programs to alter traits are used. Embodiments include corn, sorghum, soybeans, sunflowers, grapes, and citrus plants. Nursery applications, for example to breed high value ornamental materials, are also contemplated.

Remote sensing takes advantage of the interactions of radiation sources with a target. Active or passive electromagnetic radiation is within the scope of the invention. Active radiation includes artificial or induced sources such as microwave, band excitation. For the methods of the present invention, passive sunlight is generally the radiation source used, although active sources such as radar and microwaves are also within the scope of the present invention. In an exemplary embodiment, sunlight interacts with a plant canopy, which is defined as a composite of the leaves of plants growing in a field. The radiation absorbed by the canopy contributes to the temperature of the canopy which can be determined remotely. Canopy temperature is measurable by remote sensing and thermal imaging. Temperature is correlated with other traits, notably water relations and yield.

Both thermal imaging and reflectance at various wavelengths (multiple bands) are within the scope of the present invention. Multiple band remote sensing with computer-aided enhancement presents potential improvement over thermal imaging. Color infrared photographs (CIR) and reflectance measurements are appropriate, as are video images. Color infrared photographs containing signals based on plant reflectance are taken and scanned by computer. Operations are performed on the images. Signals are digitized; that is, gray levels in the photograph which are functions of reflectance are converted to a binary code. Other bands are also useful for remote sensing. For example, the middle infra-red (MIR) range is indicative of water absorbing genotypes; e.g., those containing more water. For multispectral band imaging, video cameras equipped with specific filters may be employed. Simultaneous collection is done by individual VCR recorders.

Many computer programs have been developed to digitize signals and are applicable to thermal or reflectance measurements. Some programs were developed under confidentiality agreements for the present invention. To extract the information desired, enhancement techniques known to those of skill in the art are applied to minimize background noise and to emphasize variables or combinations of variables that were tested for desirable characteristics including reproducibility and predictive value. For example, the image obtained by remote sensing may be partitioned by spectral wavebands.

In the examples described herein, reflectance and emittance are used to measure energy absorptions at various wavelengths. The near-infrared (IR) wavelength is ~700–1300 nm.

Seven thermatic mapping bands are available for electromagnetic energy measurements. Photosynthetically active radiation (PAR ~400–700 nm) incident on ($I_o$), transmitted through (T), reflected from the composite canopy-soil backgrounds (R), and reflected from the bare soil ($R_s$) provides the data for fractional absorbed PAR (FPAR) defined as $$FPAR=(I_o-T-R+TR_s)/I_o$$

In an illustrative embodiment, raw data of canopy temperature was subsequently processed to obtain the average temperature variation in each subplot (core data) down to, for example, a 3/10 of a degree centigrade. To accomplish this, videotapes were obtained of the temperature distribution over the canopy of the subplot. Generally, a unit area sampled for remote sensing measurements is a plant field unit of about 20 ft×2–4 30 inch rows, although smaller or larger geographic units are within the scope of this invention as long as each unit area contains plants of identical genotype, or genotypically identifiable subunits. This includes segregating populations in which each individual plant is assigned a geographical position within a row and evaluation is conducted. These segregating populations are derived from crossing elite germplasm stocks. Elite stocks are those with established phenotypes and genotypes known to have potential to produce commercially valuable plants when combined with other genotypes.

The methods of the present invention are useful at points in breeding programs where plants are genotypically heterogeneous; e.g., early generation $S_2$ testcrosses. After a segregant is crossed to a tester (a line of known value), a minimum of 2 rows of a common genotype may be planted in a subplot different from that of its sibs to create a canopy. Advancement decisions will be facilitated, e.g. by making plant selections based on traits appearing earlier in development.

An aspect of the present invention is that the temperature of a canopy measurable by thermal imaging is predictive of yield of the plants. Yield is an extremely important commercial trait. Yield is defined as the salable plant part appropriate for the crop. For corn, yield is the amount of grain recovered in bushels per acre. Selection of plants with relatively cool canopy temperatures as determined by remote sensing, results in increased yield compared to plants in the same environment that have warmer canopy temperatures. These plants are those most likely to produce progeny characterized by increased yield in selective breeding programs.

Methods of the present invention may also be used to detect genetic markers by remote sensing rather than by laboratory assays. Markers are heritable entities, detection of which provides evidence for the presence of other genes linked to the markers. This is particularly useful in situations wherein the other genes are less readily detected than markers. An example of popular markers are restriction fragment length polymorphisms (RFLP's) used to detect heritable quantitative traits. Markers detectable by remote sensing include the luciferase gene expression which provides a fluorescent image, and pigments. This marker may be linked to a gene in a transforming vector. Successful transformation into plants may be detected by remote sensing of fields for luciferase or other phenotypic canopy markers.

Measurements of plant energy balance have been useful in determining drought resistance. Turgor regulation via shifts in osmotic potential is a major target for the methods of genetic manipulation of the present invention. As turgor, net photosynthesis and transpiration decrease, leaf temperature increases. This increase can be measured by remote sensing techniques. As corn becomes water stressed, the leaf canopy temperature increases. Drying roots have been found to be correlated with increased leaf temperature.

Although some of the traits detectable by remote sensing are of interest per se, these traits are generally of interest as indirect indicators or predictors of other traits of commercial interest that are either not amenable to remote sensing, or for which earlier detection is desired. To accomplish the prediction of commercially desirable traits by indirect measurement of variables accessible by remote sensing, the same genotypes are grown in a variety of different, but defined environments. For example, there are many different levels of drought which may affect plants at different stages of development. Consequently, different genotypes may be optimal in different drought environments. Also, different genotypes are grown in the same environments, and their phenotypic traits are compared to select the optimal genotype for breeding.

The quantified values are compared to the physiological and agronomic data obtained on these plots either concurrently or at a future time. In this fashion, the predictive value of a first phenotypic trait determined by remote sensing is estimated.

Using the methods of the present invention, highly significant inverse correlations were found between first and second phenotypic traits, e.g., yield and canopy temperature. The higher the temperature, the less the yield. It is believed that a lower water content and, resulting reduction in physiological activity increases temperature. Based on this data, decisions to irrigate may be made at appropriate times to increase yield. With water standardized among plots containing different genotypes, temperature was predictive of optimum genotypes expressing the highest yield potential. Final advancement in breeding and evaluation programs designed to increase yield will benefit from use of remote sensing data.

Significant genotypic differences were detected for canopy spectral reflectance measured during the mid to late vegetative stage of development for the green, red and near infrared bands. These differences were detected for twenty-four hybrids grown under limited irrigation. The multispectral canopy signatures were obtained from digitized high resolution color infrared photographs. Significant inverse correlations were observed between hybrid yield and the green (−0.20*), red (−0.24**) and near-infrared (−0.18*) reflectance bands. (*=P<0.5, **=P<0.01).

In an illustrative embodiment of operations performed on the image, a principal components analysis was performed utilizing three bands of reflectance. Using three levels of image enhancement, highly significant inverse correlations (−0.58, −0.61, and −0.57**) were detected between the variability of the principal component believed to represent plant condition, and hybrid yield expression. The interpretation of this relationship is that the cause of the increased reflectance variance within a subplot is associated with increased canopy disruption or breakdown under mild stress. For hybrids maintaining canopy homogeneity, higher yield expression was realized. Such remote sensing techniques treat a canopy as an integrated complex and measures the intactness and functionality of the leaf matrix for light interception and use. These findings support the use of remote sensing techniques for measuring canopy characteristics and suggest that certain aspects of canopy reflectance and thermal emissions have predictive power for identifying valuable plant traits.

BRIEF DESCRIPTION OF THE DRAWINGS

The file of this patent contains at least one drawing executed in color. Copies of this patent with color drawings will be provided by the Patent and Trademark Office upon request and payment of the necessary fee.

DETAILED DESCRIPTION OF THE INVENTION

Figure 1:
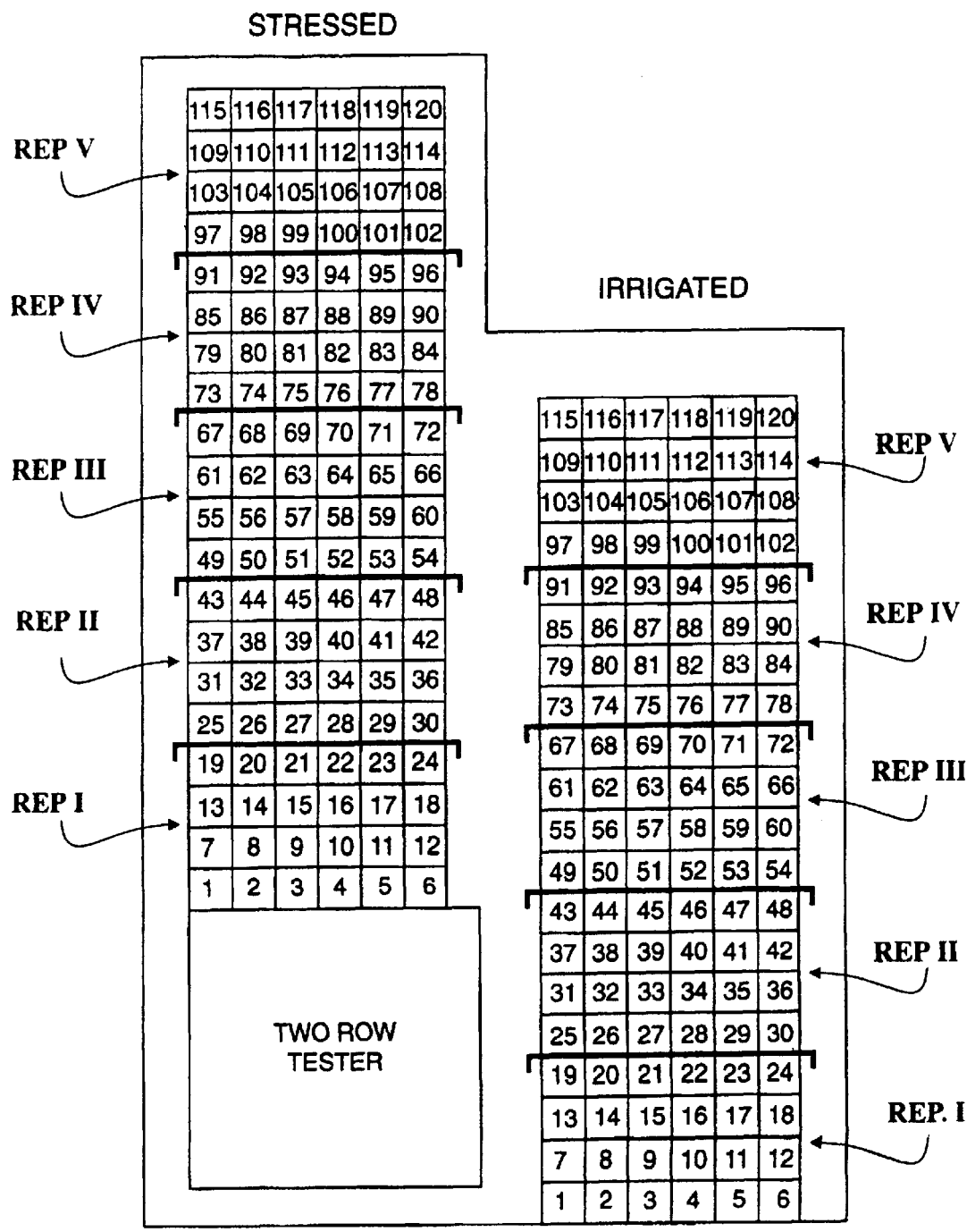
FIG. 1 is a schematic of a field plot design showing location of the irrigated and limited irrigated treatments of corn planted in one geographical location; the area marked "two row tester" was not included in the analysis; soybeans were planted in the upper right hand section.

An advantage of the methods of the present invention is that application of these methods improves the efficacy of plant evaluation and breeding programs that have as their goal improvement of plants by the identification and classification of superior performing genotypes in various environments and selection of those genotypes for evaluation and subsequent breeding. The improved methods result from incorporating remote sensing technology into plant breeding and evaluation programs.

Remote Sensing

Energy such as light, heat, and microwaves is reflected as it is emitted from soil, water and plants in the area scanned. Either energy absorption, emittance or reflectance may produce signals detectable by remote sensing sensors. Signals produced generally can range from ultraviolet to thermal wavelengths.

Reflectance of radiation from surfaces of plants, or emittance of radiation due to inherent plant processes, yields signals which can be detected by various sensors. Among the bands, there are three bands or wavelengths of reflectance that are generally used for remote sensing of plant variables. Red reflectance is a function of chlorophyll absorption. Reflectance in this band is believed to increase during times of stress of the organism. Near-infrared reflectance is a function of plant structure and composition (wavelengths 0.8–1.2 nm). Green may also serve as a quantitative diagnostic band. Other bands which are useful include middle-infrared. A color panoramic scan (real colors) also provides information on plants. Of these, red and near-infrared are most commonly used to provide indications of crop conditions and have been used in crop assessment programs. Measurements in the near infrared wavelength range have been used for global crop assessment by satellites.

In addition to reflectance at those three wavelengths, thematic mapping (TM) is a method most commonly used for analyzing plants. Canopy thermal remote sensing measures emission of long wavelength infrared energy.

Ratios between bands are commonly used for analysis. One such ratio is:

$$\frac{R}{IR} = \frac{red}{infrared}$$

As leaf area index increases and the soil is gradually covered by the canopy, reflectance in the red region of the spectrum decreases while near-infrared reflectance increases. A possible mechanism for the usefulness of this value is that under stress, red reflectance increases, the chlorophyll pigment being used less efficiently. These wavelengths are sensitive to chlorophyll presence.

Healthy green vegetation generally reflects 40 to 50% of the incident near-infrared energy (0.7 to 1.1 $\mu$m), with the chlorophyll in the plants absorbing approximately 80 to 90% of the incident energy in the visible (0.4 to 0.7 $\mu$m) part of the spectrum. Dead or senescent vegetation reflects a greater amount of energy than healthy green vegetation throughout the visible spectrum (0.4 to 0.7 $\mu$m). Conversely, it reflects less than healthy green vegetation in the reflective infrared region. Dry soil generally has higher reflectance than healthy green vegetation and lower reflectance than dead vegetation in the visible region, whereas in the near-infrared, dry soil generally has lower reflectance than green or senescent vegetation. Most vegetation indices are based on the fact that the shape of these curves differ significantly.

Some differences between species, or among phenotypic measurements are more readily resolved by some wavelengths than others. Multispectral scanning (LANDSAT) had been developed for space technology using satellite platforms; therefore, it is not surprising that multiple wavelength media has not yet found much application to more refined geographic areas and for detailed and subtle comparisons of plant values for plant assessment.

Images obtained by remote sensing may be preserved on photographic film or video images as digitized signals or images. When video imaging is used, one method to achieve multispectral scanning is to employ three separate video cameras to photograph the same areas using different filters, e.g. near-infrared, red, yellow green. A composite color infrared image may be obtained from this process. Video has advantages including near-real-time availability of imagery, reduced cost, increased processing speed, and the ability to obtain imagery in very narrow spectral bands (see Everitt et al., 1991 for a review).

Computer enhancement techniques have been developed for many applications of image analysis; e.g., to improve chromosome band resolution or discrimination of cell types in Pap smears to detect cervical cancer. (Gonzalez and Wintz, 1977; Sprawl, 1988). A goal of such enhancement is to emphasize features which may be difficult to detect or define in their raw form, by transforming their basic signals by various functions into modified signals; e.g., Fourier transforms, contrast enhancement and feature extraction algorithms. The transformed signal may be more amenable to analysis.

Another way to enhance signals is to reduce noise, thereby highlighting the signal with regard to background noise. For measurements made on plants in fields, for example, this may entail removing soil background signals from the basic image obtained by remote sensing. Wavebands (i.e. thermal) whose characteristic responses are similar for both plants and soil are more difficult to correct by enhancement and analysis techniques. Thermal scanning is also more sensitive to the environment.

The classical methods for selective breeding generally take as parents of subsequent generations, plants or animals having trait values at a preferred end of a continuous distribution of a quantitative trait of commercial interest. The efficacy of selection in this fashion is limited, however, because there are only indirect links between the selected phenotype and the underlying genotype. Selection of more directly genotypically linked traits has been suggested to improve efficacy. The basic theory for incorporating specific loci data with direct effects on a quantitative character into a selection index has been known since the 1960's (Smith, 1967). It is also known that marker loci associated with quantitative trait loci (QTLs) by position on the chromosomes, rather than by direct effects, can be used for indirect selection. (Mather and Jinks, 1971; see also Lande and Thompson, 1990; Lander and Botstein, 1989). Loci that are within certain distances of each other on chromosomes can be determined to be linked because of the propensity of alleles at these loci to segregate together in the gametes produced at meiosis. This linkage is not absolute, but may be disrupted by a natural process called "crossing over" which results in recombination of parental allelic combinations.

The phenotypic trait to be selected may be anything that is of commercial interest, such as yield, stalk and root strength, oil percentage of grain, or disease and drought resistance. The phenotype of a plant is that which is detectable and after visual inspection, measurement, or analysis by chemical, biochemical, or molecular techniques produced by the interactions of the genotype with the environment in which the plant develops. Because of these interactions, comparison of the results of the same genotypes placed in different environments may result in different phenotypes.

Environmental variables that may have to be taken into account include soil type and the amount and distribution of rainfall. One of the important and influential environmental conditions is the temperature regime of the climate in which the plants are grown. The time period needed by the plants to reach maturity (growth period) is under genotypic control. For optimum growth, the genotypically based growth period of the plant must fit within the environmental range. For example, if the plant does not fulfill its reproductive potential before the temperature drops below a threshold, the plant will not produce seed or offspring in that environment. Comparison of plants for various traits is typically made among plants of similar or identical maturity in a given environment.

For most selection schemes, plants are selected as parents of the next generation on the basis of their value for the traits of interest; for example, yield in bushels per acre, number of rows per kernel of corn, percentage of oil in the grain for soybeans. Resistance to pests such as Helminthosporium, Ostrinia and Corynebacterium is desirable.

Examples of Diseases are:

| Scientific Name | Common Name |
| --- | --- |
| Foliar Diseases: | |
| Bipolaris maydis | Southern Corn Leaf Blight |
| Exserohilum turcicum | Northern Corn Leaf Blight |
| Bipolaris zeicola | Helminthosporium Leaf Spot |
| Colletotrichum graminicola | Anthracnose |
| Kabatiella zeae | Eyespot |
| Clavibacter michiganens subsp. nebraskense | Goss's Wilt |
| Stalk Rot Complex: | |
| Colletotrichum graminicola | Anthracnose |
| Diplodia maydis | Diplodia |
| Fusarium moniliforme | Fusarium |
| Gibberella zeae | Gibberella |
| Insects: | |
| Ostrinia nubilalis | European Corn Borer |
| Spodoptera frugiperda | Fall Armyworm |

Because selection is only effective in altering traits in offspring if it changes the frequency of genes (the heritable factors) in the population under selection, success in a breeding program is a function of how closely the phenotype selected reflects the genotype of interest.

Genetic Theory for Quantitative Trait Inheritance

To appreciate the limitations and successes of plant breeding programs, it is necessary to understand the inheritance of plant traits. Mendelian genetics established that units or factors that appeared to segregate when passing from parents to offspring could exhibit the behavior expected of a single entity, eventually called a "gene." The phenotype or detectable appearance or traits of an organism results from interactions of genes with the environment. Some phenotypic traits are directly correlated with single gene segregation;

that is, the genetic transmission from parent to offspring is reflected in phenotypic similarity. These are referred to as Mendelian, single locus, or single gene traits. Other traits do not show such direct links. Traits that fit in the latter category include those that are representable in numeric terms and show a continuous distribution when population values are graphed. These traits are referred to as "quantitative" or "continuous." In crops, the traits of agronomic interest tend to be quantitative and continuously distributed. These traits include yield in bushels per acre, kernel size, drought and disease resistance, oil percentage.

For most of these traits, the quantitative distributions, resulting when values of individual plants are graphed against their relative genotypic frequencies, fit that expected from segregation of alleles at a large number of loci, each locus (a position on a chromosome) contributing a relatively small amount to the value of the phenotype. This is the polygenic model of inheritance. Another assumption of the basic model is that the heritable gene action is additive; that is, each allele contributes some predictably inheritable amount to the total quantitative value of the phenotype. Environmental and unpredictable heritable factors are then superimposed as variation on the genotypic sources of variation, to yield the phenotypic variance component of the continuous distribution of the trait. Distributions may be described by moments, notably the mean and variance (or the standard deviation which is the square root of the variance).

Before the polygenic model was developed, the observation of continuous distributions of traits initially posed an obstacle to the universal application of Mendelian theory. This apparent conflict was resolved by proposing the polygenic model for the inheritance of traits that could be described quantitatively (e.g., corn ear length, number of kernels, plant height, yield in bushels). The model proposed an underlying segregation of single genetic entities, thereby being consistent with Mendelian theory. However, because the effects of these individual genes were aggregated in the expression of the quantitative phenotypes, their individual effects could not be teased out. (Johannsen, 1909; Nilsson-Ehle, 1909; East, 1915). Environmental variation further smoothed the distribution, masking boundaries between distinct genotypic classes.

One of the next basic problems in dealing with quantitative traits was to predict the distribution of traits in the offspring from the parental distributions. By observation and careful measurements of results of various parental-offspring distributions, both in plants and animals, and by expressing the genetic relationships in mathematical correlations, a complex mathematical theory emerged (Fisher; 1918; Falconer, 1960; Wright, 1968, 1977).

A basic tenant of this theory is to express the phenotypic distribution in terms of its variance and to dissect that variance into its causative components. A variance is a standard statistical term that is a number representing the average of the squared deviations of individual values from the mean of those values. For example, if the phenotype of interest was plant height, the heights of N (a number of) plants would be measured, each height having a value $X_i$, where i=1, 2, ... N. The mean or average height would be $$\overline{X} = \sum_{i=1}^{N} \frac{X_i}{N}.$$

Each individual value for height would deviate from that mean by a value equal to $$(\overline{X}_i - X)$$

These deviations are squared and the squares are added, $$\sum_i (\overline{X}_i - X)^2$$

(for mathematic reasons not relevant to this discussion) and divided by N−1 to provide an unbiased estimate.

In summary, the variance of the phenotype=

$$V_P = \frac{\sum_i (X_i - \overline{X})^2}{N-1}$$

By studying the variance in offspring distributions where the offspring result from various types of crosses, and by determining the correlation[1] of the phenotypic distributions of different pedigree relationships (parent-offspring, offspring of the same cross, subsequent generations, e.g., $F_2$–$F_3$) it was determined that the phenotypic variance had as basic components genotypic variance ($V_G$) and environmental variance. ($V_E$).

In turn, each of these components could be further subdivided, for example, by separating $V_G$ into additive ($V_A$), dominance ($V_D$) and epistatic ($V_I$) components. The components of the variance could be estimated by breeding experiments. These values were then used to predict results of other breeding crosses.

The heritability ($h^2$) of a trait is defined as $$h^2 = \frac{V_G}{V_P},$$

[1] A correlation coefficient expresses the association between pairs of variables. Typically, a linear association is assumed. A perfect linear association would yield a correlation coefficient having a variable of +1 or −1 depending on whether one variable increases or decreases as the other increases. If the variables are independent, the correlation between them is zero. Correlation coefficients may be significantly different from zero, indicating some association, but the magnitude of the coefficient may be so small, as to be biologically uninteresting.

or more specifically, $$h^2 = \frac{V_A}{V_P}$$

and is a predictor of the degree to which values of traits may be transmitted from parents to offspring.

Recurrent Selection

An important application of these polygenic models was in selective breeding programs aimed at channeling the values of the phenotype toward one end or the other of its distribution. Selection entails choosing a sample of potential parents, the sample being based on the value of the plants for the traits being selected.

Response to selection was found to be a function of the heritability ($h^2$) of the trait, the selection differential and the intensity of selection. The intensity of selection was defined as the percent of the distribution from which the parents of the next generation are derived. The selection differential was defined as the difference between average value of the trait in the parental population vs. that of the selected parents. The cost effectiveness of selection is determined by the amount of time (in generations) required to achieve a significant change in the distribution of the trait under selection, the number of parents selected for breeding, and the response to selection. The response to selection is the difference between parental and offspring means after selection, e.g., after a generation of selective breeding.

The basic mathematical formula to predict gain from selection is as follows:

expected gain=(selection differential)×(heritability)

where selection differential is the mean value of the phenotypic trait in the selected individuals minus the overall parental population mean, and heritability is the proportion of the phenotypic variance that is due to additive genetic variance.

The change of the population mean brought about by selection, i.e., the response to selection, depends on the heritability of the trait and on the intensity of selection (selection differential). This variable depends on the proportion of the population selected, and the standard deviation of the phenotypic trait.

The basic concept of selection described above has been applied in specific breeding schemes. Success has been a function of how well the inheritance of the trait fits the assumptions of the polygenic model, and of the factors discussed above.

An example of a plant for which selective breeding has been practiced—first on a crude basis, more recently using sophisticated genetic models is corn. (Sprague and Eberhart, 1977) Until this century, only crude mass selection was practiced. Each ear of corn was harvested separately, and the most desirable ears were used to plant the ensuing crop. This method cannot be precisely evaluated because information on the effectiveness of this method is almost completely lacking, although variation among races and varieties of corn existing at the turn of the century suggest some effect. (Sprague and Eberhart, 1977, p. 305) One of the most commercially important traits, "yield," is the least amenable to change. Unexpectedly, because yield has been so difficult to improve by breeding, this trait is one for which the methods of the present invention has proved to be efficacious.

The next progression in selective breeding was "ear-to-row selection" in which the progeny of selected ears were separately evaluated by field planting and assessing the phenotypic distribution of the resulting plants.

If a character of interest were controlled by a few genes, their effects were not masked by environmental variation, and a large number of plants could be grown for evaluation of phenotypic traits, selective breeding to concentrate desirable genes in a population subsample, would be relatively straightforward. In reality, problems attending selection of most traits of commercial interest are: 1) there is control by a large number of genes (polygenic); 2) genetic effects are masked by the environment; 3) a complicated system of genetic interactions exists; and 4) the methods of isolating and evaluating lines are not wholly adequate.

A large number of loci are believed to control important commercial traits, notably, yield. Therefore, classical selection will lead to very slow changes in the mean and genetic variance of this trait because gene frequencies gradually change because each locus has only a small effect in the aggregate on the trait as a whole.

Many recurrent selection methods and techniques have been proposed to improve breeding populations. Their general theme is to repeatedly select plants based on their apparently superior phenotypes and to interbreed these to form a new improved population. The assumption is that the frequency of alleles underlying the superior phenotypes will increase in frequency due to selection.

Gain from selection can be enhanced by increasing the selection intensity (which means selecting a smaller percentage of the population as parents). This also reduces cost. However, there are risks in this approach. Key genetic factors may be excluded if the sample is too small, or deleterious effects of inbreeding may appear. One of the hindrances is the deleterious effects of inbreeding that may arise due to selection.

Remote Sensing Technology Applied to Plant Classification, Evaluation and Breeding Programs An integral step in selecting breeding programs is to classify and evaluate the phenotype. Evaluation may be direct, i.e. made on the trait to be improved by selection, or indirect, i.e. on a trait of interest due to its genetic relation to the trait of interest.

The following examples illustrate the methods of the present invention which apply remote sensing technology to identify meaningful plant expression and to improve the efficacy of classical plant breeding and evaluation programs outlined in previous sections.

Figure 2:
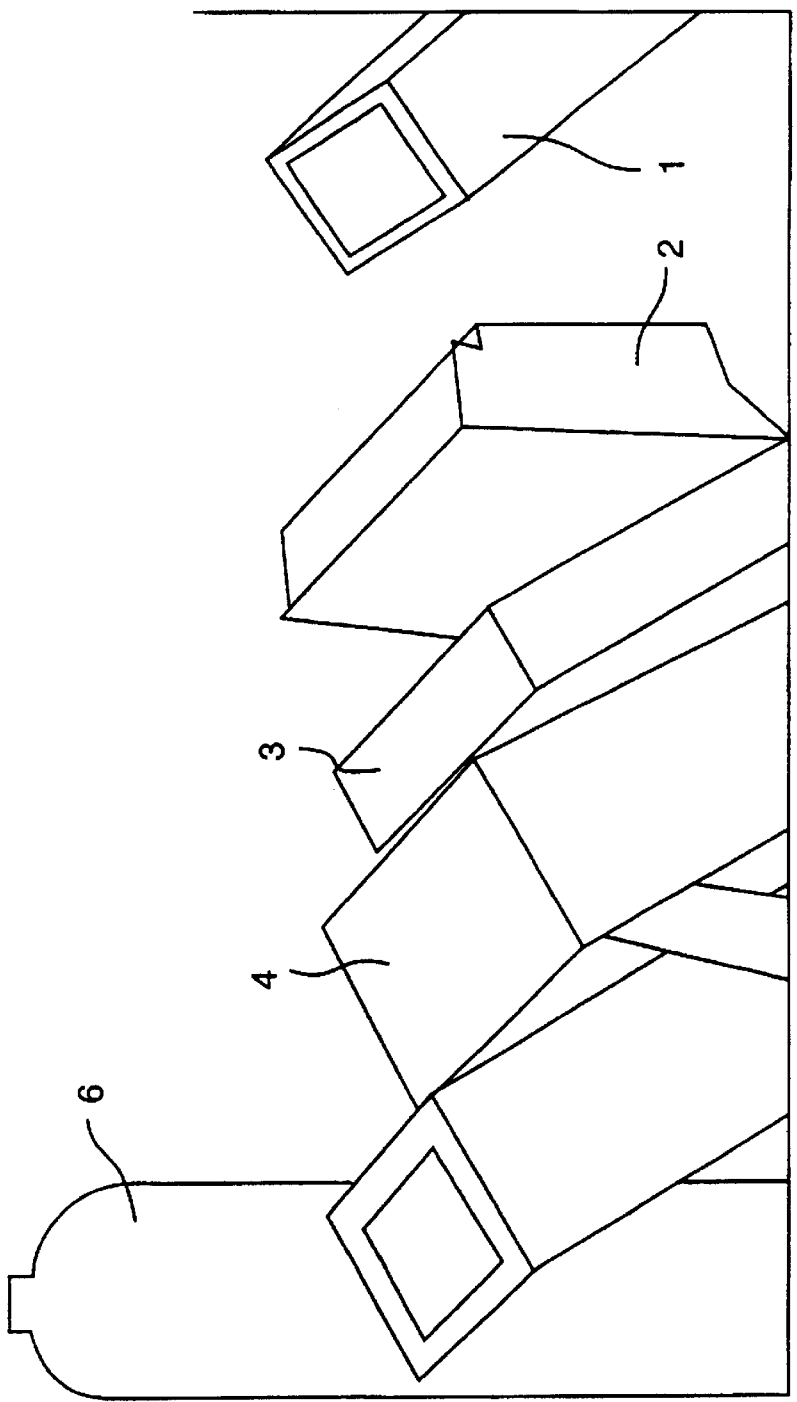
FIG. 2 is a photograph of the thermal remote sensing system mounted in place at the front right hand seat of a Cessna 172 airplane. View finders for thermal scanners used by an operator and the pilot can also be seen in the photo.
Figure 3:
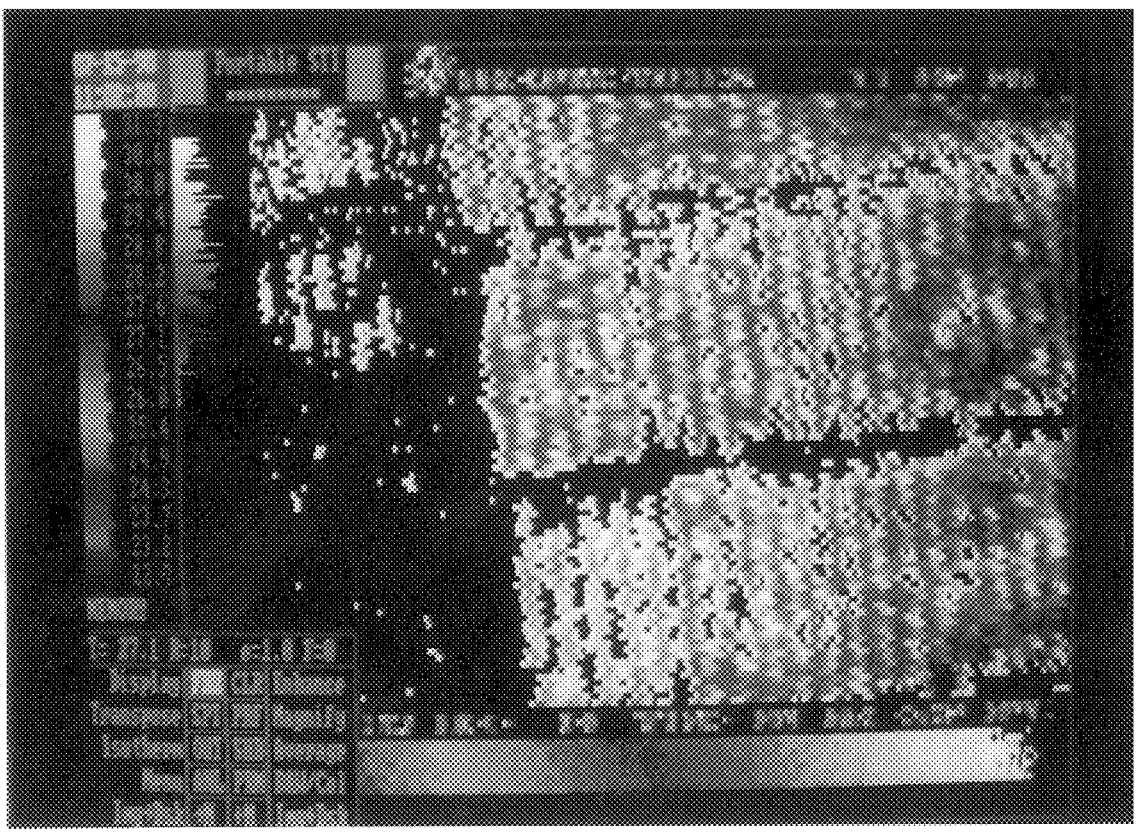
FIG. 3 is an enhanced image of canopy thermal values. The white to purple areas represent temperature distribution across several subplots. Positioned in the center of the image is a twenty foot long range containing approximately twenty rows of corn. A green polygon has been drawn around a 4 row subplot containing a common hybrid entry. Color differences within and across the rows indicate temperature differences. Actual quantitative values were obtained from grey scale data. Images due to background soil have been removed.

In an illustrative embodiment, aircraft in which a thermal scanner recording remotely sensed thermal imagery on video, as well as a camera loaded with high resolution color infrared film, flew over fields in which rows and subplots of corn plants were planted in designed experiments. (FIG. 1, See Materials and Methods). Shown in FIG. 2 from the background (front of plane) to foreground are a video monitor 1 available for the pilot, a thermal scanner 2, a video cassette recorder 3, a controller 4 (Inframetrics 600), and a video monitor for the operator 5. A liquid nitrogen tank 6 used to cool the controller is to the left. Remote sensing equipment for detection of thermal and multispectral reflectance was mounted in a aerial platform such as a Cessna 172 or similar type of aircraft. Canopy temperatures of the 4 row subplots were collected using a thermal imaging system (Inframetric Model 600). The equipment was mounted in a specially designed mount in which the thermal sensor, sensor controller, video monitor for both black/white and color enhancement display, and VCR recorders were positioned over a camera port located on the right hand side of the floor of the plane. Data of both grey scale and color output are stored on the VCR tape for future image processing. FIG. 3 illustrates a VCR frame of recorded thermal imagery undergoing image processing and analysis.

Figure 4:
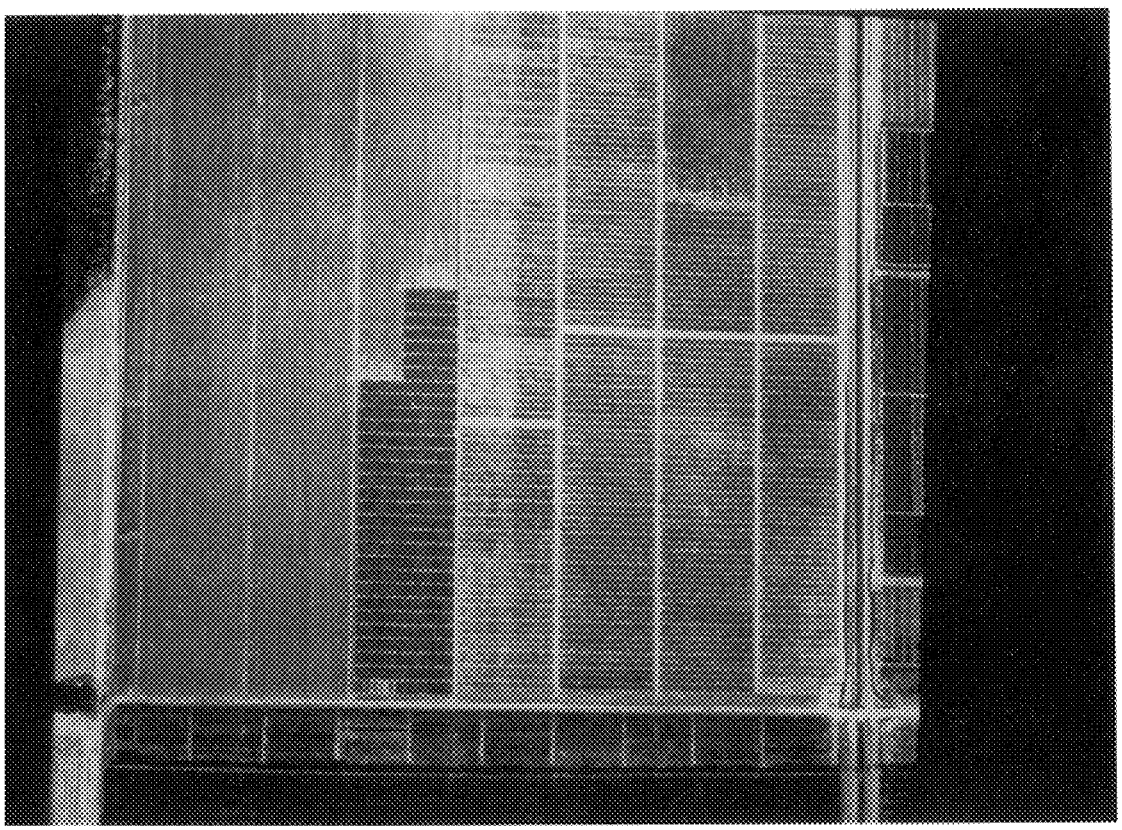
FIG. 4. is a high altitude infrared photograph of the fields in which hybrid corn plants were scanned by remote sensing. A section is further shown in FIG. 1, FIGS. 5–9.
Figure 5:
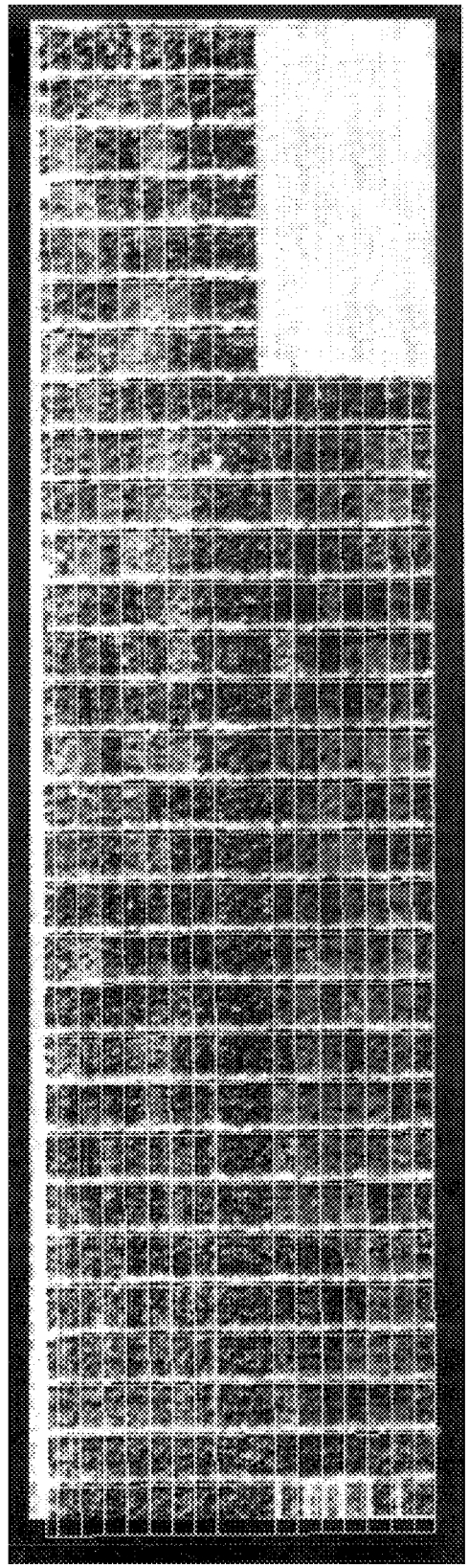
FIG. 5. is a digitized computer image of multispectral reflectance over irrigated (right) and limited irrigated (left) fields. A common hybrid entry (14 rows) was planted between the irrigation treatments. This image was subsequently used for extraction of reflectance information for the subplots using various forms of processing and analysis.

Positioned over the left hand camera port located under the pilot's seat was a Hasselblad 500 ELM camera with a 50 back and a 100 mm Zeiss Planer lens. High resolution 70 mm format color infrared film was loaded into the camera. This film type captures a composite of 3 channels: blue, green and red, which are green, red and near-infrared reflectance, respectively. Either before or after low level thermal scanning, color infra-red photography was taken at appropriate altitudes to allow for complete capture of the field of interest. FIG. 4 illustrates a relatively high altitude photograph of the overall experimental layout. Qualitative differences can be seen in color shifts corresponding to the 4 row plots of each hybrid entry. The color infrared photograph was digitally scanned at the highest possible resolution. FIG. 5 illustrates a digitized computer image of the limited irrigated (left) and irrigated (right) treatments of the experiments. The water treatments were separated by a border of a common genotype accounting for the uniform band running top to bottom in the center of the photograph. From such digitized images various processing techniques were used to extract reflectance information and relate this information to ground based measurements.

During thermal data collection, the plane flew over the experimental fields at approximately 70 knots at a height of about 150–200 feet when scanning. For example, 12–14 row swaths may be scanned. Markers (e.g., foil panels which appear as cold bodies) on the field provided reference points on the image because they have very different heat profile than plants and soil. These markers delineate plants of specified genotypes. The desired remotely sensed data are quantified canopy thermal values as well as data from other bands of canopy reflectance which are indicative of canopy/crop condition. Associated with these values is the appropriate descriptive statistical information relating to quantification within a given subplot. The additional CIR bands collected were used to compute vegetative indices used for crop condition estimates.

Large format color infrared film, for example, 70 mm, which is sensitive to green, red, and near-infrared wavebands, is one type of film suitable for the methods of the present invention. Frames separated from a VCR (thermal), or photographs (CIR), were used to collect the raw data.

The qualitative image on the film or video frames are divided into small quantifiable areas called "pixels". The pixel value is a gray level which is converted to a numerical scale of 0–256, corresponding to density on the image. For example, the value represents temperature if thermal imaging was done. A temperature scale difference of 10° C., may be subdivided into about 250 units on the gray scale. This process is called digitization and is well known in concept to those of skill in the art.

Resolution of the subplots by remote sensing from a given air platform relates to how many pixels are required per subplot to allow for sufficient resolution in order to distinguish it from another subplot. The elevation/scan has to be chosen to allow for resolution capable of distinguishing data on different areas.

The next step in the image analysis is generally image analysis and enhancement. For any particular application, standardization is accomplished by comparing the ability of the enhanced image to produce an answer or to predict what is known, as compared to the unenhanced image. For example, if the yields of two plots of corn are known, and therefore, the difference in yield is known, that enhancement algorithm that produces the most accurate yield discrimination is selected for future use to predict yield when it is unknown.

In some embodiments, developmental stages must be considered to determine optimal scanning stages.

In the case of tasseled plants such as corn, it is preferred to scan canopies at the preflowering or postflowering stage to avoid comparing tasseled vs. non-tasseled plants. For example, a uniform stage for scanning corn is solid mid-vegetation stage.

Stepwise photos are generally taken. An illustrative embodiment sequence would be to photograph:

1. the overall plot area.
2. a total plot within a treatment area.
3. a plot showing mostly soil because plants are low, to obtain background values.
4. semi-mature plants.
5. mature plants.
6. the same leaves in different conditions, e.g., shadowed vs. sunlit.

Ground observations of variables such as water relations, leaf roll, degree of leaf erectness (vs. floppiness) may be obtained to assist in interpretation of remote sensing data. As a function of genotype, leaf rolling in response to stress, may vary and be used as an independent predictor of other traits.

After the data was collected by remote sensing and processed, it was codified within the grid identifying plots by numbers. A plot may be divided into numbered subplots and further by rows. Various descriptive statistics were calculated for the phenotypic traits (means, standard deviations, ranges, number of vegetation pixels, peak, %, skew). Statistical analysis was performed on the data. This analysis includes calculation of correlations between plant variables detected, and/or between those variables and either variables directly measured for purposes of calibration, e.g., yield, or environment variables defining the plot. Environmental variables include temperature, moisture and soil type.

Figure 6:
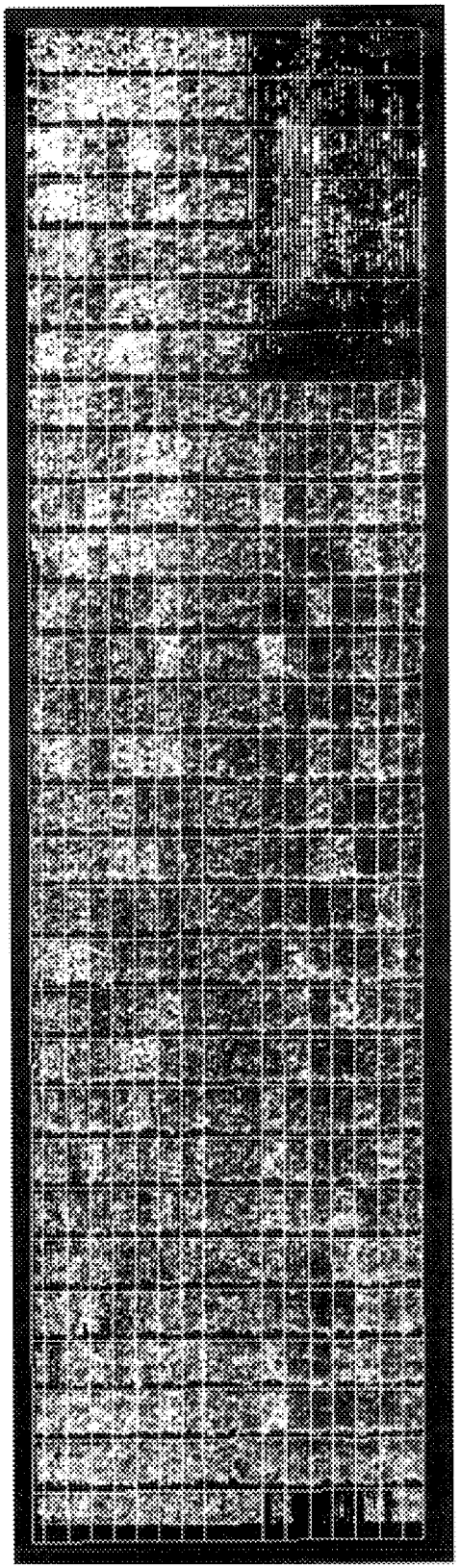
FIG. 6. is an image obtained from the same fields as shown in FIG. 5, showing green reflectance.
Figure 7:
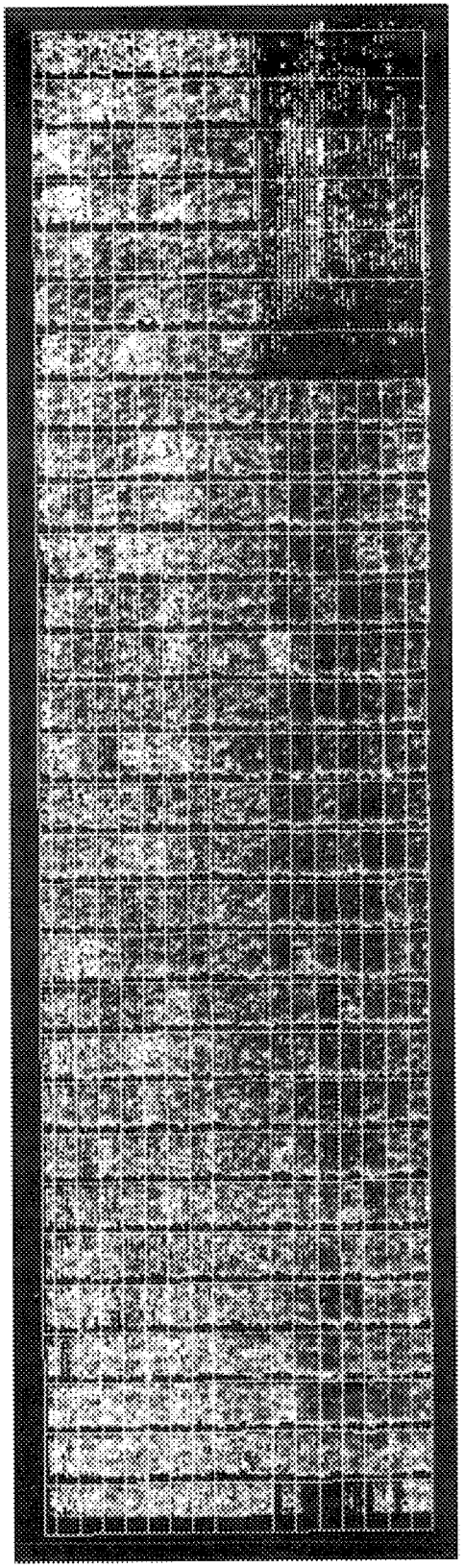
FIG. 7. is an image obtained from the same fields as shown in FIG. 5, showing red reflectance.
Figure 8:
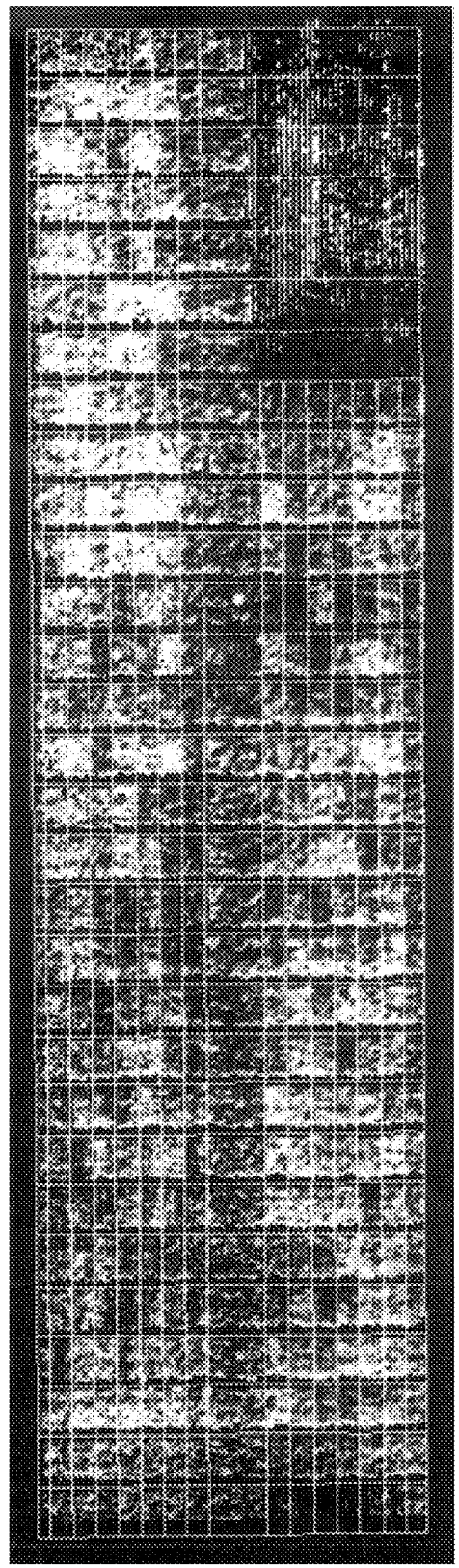
FIG. 8. is an image obtained from the same fields as shown in FIG. 5, showing near infrared (NIR) reflectance.

In an exemplary embodiment, CIR photographs revealed qualitative differences between the four row subplots across both limited and full irrigation treatments (FIG. 4). These photographs were subsequently processed (FIG. 5) to generate quantified values for the three bands or wavelengths of reflectance used to create the photograph. The three bands were green, red and near-infrared (not thermal) portions of the energy spectrum. FIGS. 6–8 show the green, red and near infrared results on the same field as in FIG. 4. The red and near-infrared bands were considered to be indications of the crop conditions, having been used by others in crop assessment programs. The red band corresponds to chlorophyll absorption and, according to theory, reflectance in this band increases during times of stress. Reflectance in the near-infrared region is predicted to decrease with increasing stress. The near-infrared region is believed to be related to plant structure and composition.

The following examples provide illustrative embodiments of the present invention.

EXAMPLE 1

Classification of Hybrid Corn Genotypic Differences for Remotely Sensed Canopy Thermal Characteristics in the Same Environment and the Relationship of These Differences to Yield Performance Significant genotypic variation for leaf tissue midday water relations, physiological activity including leaf temperature and leaf rolling have been observed in both inbred and hybrid corn germplasm grown under various field conditions. Highly significant correlations have been detected between leaf tissue water status, the degree of observable leaf rolling and physiological activity. Out of such findings, generalized models of adaptive hydraulic responses have been developed. The recognition of these hydraulic response types suggest the specific way a plant regulates its internal water relations is associated with a cascade of physiological responses which culminates in the plant's ability to regulate its energy balance with the environment in which it is growing. Therefore, genotypes differing in plant energy balance may reflect differing abilities to perform within or even across environments.

An actively transpiring leaf or canopy has a relatively cooler temperature than the surrounding air, while a reduced or nontranspiring leaf or canopy will have a relatively hotter, or a temperature closer to that of ambient air. As corn becomes water stressed, leaf temperature increases. Therefore, a leaf or canopy with a cooler temperature has a more favorable energy balance with its environment than a leaf or canopy with an elevated temperature. These associations suggested that canopy temperature differences be used for large scale assessment of germplasm response and performance to environmental conditions. However, limitations of ground based temperature measurement methodologies mainly due to the length of time required for data collection, make such assays not commercially feasible.

Specific problems in measuring canopy temperatures using hand held sensors include environmental conditions (e.g., sun angle, clouds, and wind) changing throughout the day and affecting air and crop temperature. In addition, only individual leaves are measured, giving a small biased representation of the entire canopy of a plant or subplot. Another constraint with hand-held devices is the accessibility of leaves once the plants become tall.

In the present example, data collection by remote sensing techniques utilizing a thermal scanning system mounted on an aerial platform overcame many of these limitations. Canopy thermal characteristics of a diverse set of corn hybrids was measured via a remote sensing system, and observed differences of canopy temperature were related to the agronomic performance of these hybrids. These results lay the basis for screening a large number of hybrid entries in a plant breeding or evaluation program.

Highly significant ($P \leq 0.001$) genotypic differences were detected for canopy temperatures during an 11:00 a.m. to noon scan for 24 hybrids grown under irrigated conditions (Table 1). (In all tables, the letters shown on each row indicate which means are significantly different using the least significant difference (LSD) multiple means comparison test. Canopy temperatures of the hybrids ranged from 27.31° C. for hybrid HA8502E.LH132 up to 28.41° C. for hybrid 4971A.LH132. The overall canopy mean temperature averaged across the genotypes was 27.87° C. The level of experimental variation (1.86%) was considered to be exceptionally low.

Hybrid performance was quantified through the determination of the quantity of grain harvested from each hybrid in the study (Table 2). Highly significant ($P \leq 0.001$) genotypic differences were observed for yield across the 24 hybrids grown under irrigated conditions. There was over a 50 bushel range across the hybrids. Pioneer 3362 yielded 196 bu/A compared to F204.LH51 with a yield of 143 bu/A.

Remotely sensed canopy temperatures exhibited an inverse relationship to yield levels expressed by the various hybrids. The correlation coefficient between these two parameters was −38 ($P \leq 0.06$). The canopy temperatures were measured during the mid point of the hybrids' life cycle and was predictive of the yielding capability of those hybrids for the entire season.

These results demonstrate that remotely sensed canopy temperatures are related to yield level within an environment. Hybrids expressing higher yield levels tended to have cooler canopies compared to lower yielding hybrids. These results support the concept that detection of genotypic differences for canopy temperature has predictive value in identifying genetically based yield expression. Included in this is the identification of superior performance. Thermal remote sensing with an airborne scanner measured canopy temperatures with exceptionally low experimental error and is considered to be a marked improvement over handheld devices. Coupling this level of precision with the measurement throughput and output capability of remote sensing technique, predicts commercial feasibility for large scale assessments. Canopy temperature of corn germplasm may be used as a selection criteria or trait in the identification and subsequent advance of germplasm within a breeding or evaluation program.

TABLE 1

Remotely sensed canopy temperatures of 24 hybrids grown under irrigated conditions

| Hybrid | Canopy Temperatures[1] (° C.) Irrigated |
|---|---|
| HA8502E.LH132 | 27.31 i |
| B73Ht.MBSU | 27.42 ij |
| P3377 | 27.47 hij |
| P3417 | 27.56 ghij |
| F204.HBA1 | 27.57 ghij |
| T1100 | 27.62 fghij |
| LH132.NL126A | 27.68 efghi |
| DADG48.LH38 | 27.72 efghi |
| LH82.LHE136 | 27.76 defgh |
| P3343 | 27.77 defgh |
| LH119.LH59 | 27.80 cdefg |
| P3379 | 27.81 cdefg |
| P3362 | 27.84 cdefg |
| 4971A.NL005 | 27.93 cdef |
| 8F036.LA021 | 27.96 cde |
| 98609C.LH132 | 27.97 cde |
| P3503 | 27.99 cde |
| LH119.LH51 | 28.07 bcd |
| LH51.LH74 | 28.09 abc |
| DCD1.LH51 | 28.11 abc |
| F204.LH51 | 28.34 ab |
| 8F036.LH38 | 28.36 ab |
| 6F541.MBSU | 28.38 ab |
| 4971A.LH132 | 28.41 a |
| Mean | 27.87 |
| Prob > F | .0001 |
| LSD | .32 |
| CV (%) | 1.86 |

[1]Means within a column followed by the same letter are not significantly different according to the Least Significant Difference (LSD) multiple means comparison test.

TABLE 2

Mean yields of 24 hybrids grown under irrigated conditions

| Hybrid | Yield(bu/A)[1] |
|---|---|
| P3362 | 196.04 a |
| P3417 | 187.34 ab |
| 98609C.LH132 | 183.65 abc |
| HA8502E.LH132 | 183.08 abcd |
| P3377 | 182.13 bcd |
| P3379 | 180.97 bcde |
| DADG48.LH38 | 179.00 bcdef |
| LH51.LH74 | 175.62 bcdefg |
| P3503 | 172.85 cdefgh |
| T1100 | 169.91 defgh |
| 8F036.LH38 | 169.62 defgh |
| LH119.LH59 | 169.45 defgh |
| 4971A.NL005 | 167.77 efgh |
| LH82.LHE136 | 165.99 fghi |
| 8F036.LA021 | 163.61 ghij |
| F204.HBA1 | 160.03 hijk |
| 4971A.LH132 | 153.56 ijkl |
| LH119.LH51 | 152.62 ijkl |
| P3343 | 151.29 jkl |
| DCD1.LH51 | 150.90 jkl |
| B73Ht.MBSU | 149.74 kl |
| LH132.NL126A | 148.39 kl |
| 6F5431.MBSU | 146.11 l |
| F204.LH51 | 143.48 l |
| Mean | 166.82 |
| Prob. > F | 0.0001 |
| LSD | 13.71 |
| CV (%) | 6.54 |

[1]Yields adjusted to 15.5% moisture. Means within a column followed by the same letter are not significantly different according to the Least Significant Difference (LSD) multiple means comparison test.

EXAMPLE 2

Classification of Genotypic Differences for Canopy Temperatures Within and Across Environments as Determined with Remote Sensing Techniques The capability of remote sensing techniques to detect or measure the trait or feature over a range of environments, is demonstrated in this example. Genotypic variation for canopy temperature characteristics was determined by remote sensing within and across two environments defined by water availability. This variable is one major environmental factor responsible for causing growing conditions to vary across a region such as the corn belt. A set of twenty-four hybrids were planted under two irrigation treatments. One plot received full irrigation whereas for the other plot, the "stress plot," irrigation was withheld for certain periods of time. Therefore, different irrigation treatments were used to simulate different growing conditions or environments. Because the plants in the two water environments were next to each another, other environmental variables were expected to be similar.

Degree of Stress Development:

Drought imposition on the stress plot began at the seventh to eighth leaf stage. Approximately ten days later, leaf rolling became noticeable on some genotypes. The water deficit continued to develop until four inches of rain fell 12 days later. No visible water stress symptoms were seen after that date. The duration of the water deficit was considered to have lasted approximately 7 to 10 days. In addition to water stress, temperatures in excess of 100° F. occurred early in the drought imposition period. The growing season was slow due to overall cool spring conditions. The mean yield levels for the irrigated and limited irrigated plots were 167 and 148 bu/A respectively (Tables 2 and 3). There was approximately a 10% reduction in yield between the plots which was presumably caused by the water stress during the mid-vegetative stage of development. Overall, the responses characterized were associated with stress conditions. Stress conditions occur unpredictably over large areas during any given year and result in yield reductions.

TABLE 3

Mean yields of 24 hybrids grown under limited irrigated conditions

| Hybrid | Yield(bu/A)[1] |
| --- | --- |
| 98609C.LH132 | 164.47 a |
| P3417 | 163.31 ab |
| P3362 | 162.89 ab |
| P3503 | 159.33 abc |
| T1100 | 158.53 abc |
| HA8502E.LH132 | 157.65 abcd |
| P3379 | 156.70 abcde |
| LH82.LHE136 | 155.00 abcdef |
| LH119.LH59 | 154.57 abcdef |
| LH51.LH74 | 153.24 abcdefg |
| P3377 | 152.37 abcdefg |
| 8F036.LH38 | 151.63 abcdefg |
| DADG48.LH38 | 151.42 abcdefg |
| 4971A.NL005 | 149.11 bcdefgh |
| 4971A.LH132 | 148.73 bcdefgh |
| F204.HBA1 | 146.85 cdefghi |
| P3343 | 143.34 defgij |
| LH132.NL126A | 142.40 efghij |
| LH119.LH51 | 140.61 fghij |
| F204.LH51 | 139.64 ghij |
| 8F036.LA021 | 136.59 hijk |
| 6F541.MBSU | 132.49 jki |
| DCD1.LH51 | 129.85 jk |
| B73Ht.MBSU | 123.76 k |

TABLE 3-continued

Mean yields of 24 hybrids grown under limited irrigated conditions

| Hybrid | Yield(bu/A)[1] |
| --- | --- |
| Mean | 148.94 |
| Prob. > F | 0.0001 |
| LSD | 14.64 |
| CV (%) | 7.83 |

[1]Means within a column followed by the same letter are not significantly different according to the Least Significant Difference (LSD) multiple means comparison test.

Midday Leaf Water Relations:

Leaf water status is quantified through the measurement of the water relation parameters and is defined through the relationship $\psi w = \psi s + \psi p$. The total water potential ($\psi w$) is reflective of the overall relative water activity within the leaf tissue. The osmotic potential ($\psi s$) of the tissue gives an indication of the relative activity of the molecules dissolved in the water of the tissue. Both $\psi w$ and $\psi s$ are expressed in negative values. Turgor potential ($\psi p$) is the positive pressure that is produced from the interaction of the activity of the water within the tissue ($\psi w$) and the solutes dissolved ($\psi s$) in this water. Therefore, turgor regulation is achieved through the coordination of both $\psi w$ and $\psi s$. Water relation parameters are utilized as quantitative markers of plant response to water deficit.

Midday leaf water relations parameters were measured in the limited irrigated plot on several sampling dates. The pooled hybrid stress data produced highly significant ($P \leq 0.0001$) genotypic differences for all three of the water relation parameters. Pooled hybrid means for the water relations are shown in Table 4 and 5. The mean value of $\psi w$ within the limited irrigated plot was −9.8 bars compared to −5.6 bars for the irrigated hybrids (Tables 4 and 5). The higher level of midday leaf water stress under the limited irrigation plot produced a greater range among hybrid means for leaf $\psi w$ (1.93 bars) compared to the range observed in the irrigated hybrid plot (1.64 bars). In addition, by pooling several dates in the stress plot, the LSD was considerably reduced. The mean value of $\psi s$ in the limited irrigated plot was −16.7 bars compared to −14.8 bars for the irrigated hybrids indicating that some osmotic adjustment was associated with the stress conditions. Both sets of values document that the limited irrigated plot was under stress relative to the irrigated plot during the measurement period. Turgor potential was, on the average, depressed by over 2 bars in the limited irrigated plot relative to the irrigated plot.

TABLE 4

Pooled midday leaf water relations of 24 hybrids grown under limited irrigation[1]

| | (bars) | | |
| --- | --- | --- | --- |
| Hybrid | $\psi p$ | $\psi s$ | $\psi w$ |
| P3417 | 8.51 a | −18.68 h | −10.17 efg |
| P3362 | 8.27 ab | −17.98 gh | −9.71 bcdef |
| P3379 | 8.14 abc | −17.58 fg | −9.44 abcd |
| P3377 | 8.05 abc | −18.83 h | −10.77 gh |
| F204.LH51 | 7.81 abcd | −17.00 def | −9.20 ab |
| LH51.LH74 | 7.78 abcd | −17.16 efg | −9.66 bcdef |
| 8F036.LH38 | 7.55 abcd | −16.88 def | −9.33 abc |
| 8F036.LA021 | 7.54 abcde | −17.17 efg | −9.63 bcdef |
| F204.HBA1 | 7.44 bcde | −16.38 cde | −8.95 a |
| LH119.LH59 | 7.22 cde | −16.88 def | −9.65 bcdef |

TABLE 4-continued

Pooled midday leaf water relations of 24 hybrids grown under limited irrigation[1]

(bars)

| Hybrid | $\psi p$ | $\psi s$ | $\psi w$ |
|---|---|---|---|
| HA8502E.LH132 | 7.22 cde | −16.14 abcd | −8.92 a |
| LH132.NL126A | 7.03 def | −16.23 bcd | −9.20 ab |
| DCD1.LH51 | 7.02 def | −16.88 def | −9.85 bcdef |
| P3503 | 6.97 def | −16.38 cde | −9.41 abcd |
| 4971A.NL005 | 6.95 def | −15.85 abc | −8.91 a |
| T1100 | 6.88 defg | −16.82 def | −9.95 cdef |
| 98609C.LH132 | 6.52 efgh | −17.21 efg | −10.69 gh |
| LH119.LH51 | 6.18 fghi | −15.85 abc | −9.67 bcdef |
| 6F541.MBSU | 6.11 fghi | −16.12 abcd | −10.01 def |
| DADG48.LH38 | 6.10 fghi | −16.35 cde | −10.25 fgh |
| LH82.LHE136 | 5.92 ghi | −15.69 cdef | −10.72 gh |
| P3343 | 5.78 hi | −15.34 ab | −9.56 abcde |
| 4971A.LH132 | 5.40 i | −15.30 a | −9.89 cdef |
| 873Ht.MBSU | 5.35 i | −16.24 bcd | −10.88 h |
| Prob > F | 0.0001 | 0.0001 | 0.0001 |
| LSD | 1.02 | 0.92 | 0.66 |
| CV (%) | 7.00 | 7.65 | 9.31 |

[1]Means within a column followed by the same letter are not significantly different according to the Least Significant Difference (LSD) multiple means comparison test.

TABLE 5

Midday leaf water relations of 24 hybrids grown under irrigated conditions[1]

(bars)

| Hybrid | $\psi p$ | $\psi s$ | $\psi w$ |
|---|---|---|---|
| P3362 | 10.61 | −16.09 | −5.48 abc |
| 8F036.LA021 | 10.49 | −15.85 | −5.36 ab |
| PP3379 | 10.13 | −15.97 | −5.84 abcd |
| P3417 | 9.99 | −15.55 | −5.56 abc |
| LH119.LH51 | 9.94 | −15.22 | −5.28 ab |
| 98609C.LH132 | 9.93 | −15.49 | −5.56 abc |
| LH51.LH74 | 9.91 | −15.43 | −5.52 abc |
| 4971A.LH132 | 9.58 | −14.94 | −5.36 ab |
| P3343 | 9.54 | −15.58 | −6.04 bcd |
| 8FO36.LH38 | 9.39 | −14.75 | −5.36 ab |
| LH132.NL126A | 9.29 | −14.37 | −5.08 ab |
| P3503 | 9.23 | −14.63 | −5.40 abc |
| 6F541.MBSU | 9.21 | −14.09 | −4.88 a |
| DCD1.LH51 | 9.02 | −14.22 | −5.20 ab |
| 4971A.NL005 | 9.01 | −14.25 | −5.24 ab |
| LH119.LH59 | 8.96 | −14.48 | −5.52 abc |
| F204.HBA1 | 8.94 | −15.34 | −6.40 cd |
| DADG48.LH38 | 8.91 | −14.23 | −5.32 ab |
| T1100 | 8.82 | −14.82 | −6.00 bcd |
| P3377 | 8.61 | −15.33 | −6.72 d |
| B73Ht.MBSU | 8.47 | −13.75 | −5.28 ab |
| HA8502E.LH132 | 8.37 | −13.77 | −5.40 abc |
| F204.LH51 | 8.29 | −14.25 | −5.96 bcd |
| LH82.LHE136 | 7.96 | −14.54 | −6.68 d |
| Prob > F | NS | NS | 0.04 |
| LSD | 1.78 | 1.83 | 1.03 |
| CV (%) | 15.30 | 9.82 | 14.69 |

[1]Means within a column followed by the same letter are not significantly different according to the Least Significant Difference (LSD) multiple means comparison test.

TABLE 6

Pooled leaf gas exchange data for 24 hybrids grown under limited irrigated conditions[2]

| Hybrid | Photosynthetic Activity umoles $CO_2 m^{-2} s^{-1}$ | Transpiration mmoles $H_2O m^{-2} s^{-1}$ | Leaf Temperature Differential[1] °C. |
|---|---|---|---|
| HA8502E.LH132 | 28.04 a | 9.33 a | −0.77 i |
| 8F036.LH38 | 27.45 ab | 9.33 a | −0.79 i |
| F204.HBA1 | 26.83 abc | 9.19 ab | −0.72 hi |
| P3362 | 25.78 abcd | 8.92 abc | −0.61 ghi |
| P3379 | 25.02 abcde | 8.77 abcd | −0.52 fghi |
| T1100 | 24.81 abcde | 8.68 abcde | −0.57 fghi |
| P3503 | 24.08 abcdef | 8.59 abcde | −0.45 efghi |
| P3417 | 23.29 bcdefg | 8.41 abcdef | −0.35 defghi |
| DCD1.LH51 | 23.27 bcdefg | 8.39 abcdef | −0.37 defghi |
| LH132.NL126A | 23.19 bcdefg | 8.36 abcdef | −0.36 defghi |
| 4971A.NL005 | 23.17 bcdefg | 8.31 abcdefg | −0.30 cdefgh |
| 8F036.LA021 | 23.03 bcdefg | 8.47 abcdef | −0.39 defghi |
| LH51.LH74 | 22.81 cdefg | 8.16 bcdefgh | −0.37 defghi |
| DADG48.LH38 | 22.71 cdefg | 8.41 abcdef | −0.36 defghi |
| LH119.LH59 | 22.19 defg | 8.20 bcdefg | −0.26 bcdefgh |
| F204.LH51 | 22.19 defg | 8.21 bcdefg | −0.29 cdefgh |
| P3343 | 21.09 efgh | 7.93 cdefghi | −0.19 bcdefg |
| B73Ht.MBSU | 20.06 fgh | 7.78 defghi | −0.05 abcde |
| LH119.LH51 | 19.65 fgh | 7.66 efghi | −0.11 abcdef |
| P3377 | 19.35 gh | 7.53 fghi | 0.02 abcd |
| 6F541.MBSU | 18.71 gh | 7.28 ghi | 0.13 abc |
| LH82.LHE136 | 17.51 h | 7.13 hi | 0.21 ab |
| 98609C.LH132 | 17.29 h | 7.01 i | 0.18 ab |
| 4971A.LH132 | 16.89 h | 6.93 i | 0.32 a |
| Prob > F | .0001 | .0001 | .0001 |
| LSD | 4.64 | 1.04 | 0.47 |
| CV (%) | 28.36 | 17.32 | — |

[1]Leaf temperature differential = leaf temperature − air temperature. A positive value indicates an elevated leaf temperature compared to the surrounding air.
[2]Means within a column followed by the same letter are not significantly different according to the Least Significant Difference (LSD) multiple means comparison test.

TABLE 7

Pooled midday leaf rolling scores[1] for 24 hybrids grown under limited irrigation[2]

| Hybrid | Leaf Rolling Score |
|---|---|
| F204.HBA1 | 4.67 a |
| 8F036.LA021 | 4.60 ab |
| HA8502E.LH13 | 4.60 ab |
| F204.LH51 | 4.60 ab |
| LH51.LH74 | 4.47 bc |
| 4971A.NL005 | 4.43 bc |
| 8F036.LH38 | 4.33 cd |
| LH132.NL126A | 4.33 cd |
| P3417 | 4.30 cd |
| P3379 | 4.23 d |
| P3362 | 4.23 d |
| DCD1.LH51 | 4.23 d |
| P3503 | 4.23 d |
| 4971A.LH132 | 4.20 de |
| T1100 | 4.17 def |
| LH119.LH59 | 4.03 efg |
| DADG48.LH38 | 4.80 fg |
| LH119.LH51 | 3.87 gh |
| P3377 | 3.00 hi |
| 6FS41.MBSU | 3.67 ij |
| P3343 | 3.60 j |
| B73Ht.MBSU | 3.50 j |
| 98609C.LH132 | 3.13 k |
| LH82.LHE136 | 3.10 k |
| Prob. > F | 0.0001 |

TABLE 7-continued

Pooled midday leaf rolling scores[1] for 24 hybrids grown under limited irrigation[2]

| Hybrid | Leaf Rolling Score |
|---|---|
| LSD | 0.20 |
| CV (%) | 6.66 |

[1]Leaf rolling score: 5 = flat leaf to 1 = severely rolled.
[2]Means within a column followed by the same letter are not significantly different according to the Least Significant Difference (LSD) multiple means comparison test.

Significant ($P \leq 0.05$) genotypic differences were detected for ψw. Differences among hybrid means for ψs and ψp were not significant. The above results demonstrate that the water relations of the hybrids grown under the two irrigation treatments were in fact different. These results support the reason for the yield reduction of the limited irrigated plot compared to the hybrids grown under full irrigation.

Net photosynthetic ($CO_2$ uptake) and transpiration ($H_2O$ loss) rates were determined among the hybrids grown under limited irrigation (Table 6). These two gas exchange measurements give an overall estimation of the relative activity of photosynthetic tissue. Among the hybrids grown under the stress conditions, highly significant differences existed for both photosynthetic and transpirational activity (Table 6). Photosynthetic activity was significantly correlated with both total water potential (+0.68) and turgor potential (+0.59). Likewise, transpiration rate was also significantly correlated to total water potential (+0.66) and turgor potential (+0.58).

Midday leaf rolling scores were recorded for the hybrids grown under limited irrigation at approximately the same time as the quantitative water relations measurements. Highly significant ($P \leq 0.01$) hybrid differences were observed for leaf rolling (Table 7). Leaf rolling scores were significantly correlated ($P \leq 0.01$) with total water (+0.79) and turgor (+0.58) potential. These correlations indicate that for these hybrids, some of the quantitative water relations parameters were reflected by the visual appearance of the leaves.

The physiological and morphological characteristics were collected to establish the relationship of important indicators of plant activity and productivity to thermal canopy characteristics.

Remotely Sensed Canopy Temperatures and Relationship to Plant Physiological Conditions:

Highly significant ($P \leq 0.0001$) genotypic differences were detected for canopy temperatures during an 11:00 a.m. to noon scan for the hybrids grown under the two irrigation regimes (Table 8). Canopy temperatures ranged from 27.31° C. for hybrid HA8502E.LH132 up to 28.41° C. for hybrid 4971A.LH132 under irrigated conditions. Canopy temperatures ranged from 27.96° C. for P3503 up to 28.75° C. for P3379 under stress conditions. The mean canopy temperature of the irrigated plot was over 0.4° C. cooler than the hybrid canopies under limited irrigation.

In order to establish the use of canopy thermal scanning as a screening tool for plant evaluation it is paramount to correlate the remotely sensed data with physiological status. This is particularly true if one is interested in screening for improved environmental stress tolerance.

Significant correlations ($P \leq 0.05$*) were observed between remotely sensed data and important measures of plant condition. Significant inverse relationships were detected between remotely sensed canopy temperatures and both the degree of leaf rolling photosynthetic activity (−0.20*).

These results demonstrate that significant genotypic variation for remotely sensed canopy temperature can be detected for hybrids within and across environments and related to significant measures of physiological activity and status under stress condition.

EXAMPLE 3

Use of Canopy Multispectral Reflectance of Corn Germplasm to Predict Yield Performance in Plant Evaluation and Selection Programs In addition to collecting canopy information in the thermal region of the spectrum as illustrated with Examples 1 and 2, High Resolution Color Infrared (CIR) photography was taken over these plots. These photographs revealed qualitative differences between the 4 row subplots of the 24 hybrids grown within and across the water treatments. A CIR photograph of the stress and irrigated plots is shown in FIG. 4. Digitization and subsequent image analysis of the photograph was performed to generate quantified values for the three bands of reflectance used to create the photograph (FIG. 5). The three bands include the green, red and near infrared (not thermal) portions of the energy spectrum. The near-infrared band is considered to be an indicator of crop conditions and is used in satellite crop assessment programs. Reflectance in the near-infrared region is predicted to decrease with increasing stress and is believed to be related to plant structure and composition. The red band corresponds to chlorophyll absorption and according to theory, reflectance in this band increases during times of stress. The quantified values are compared to the physiological and agronomic data taken on these plots for standardization and calibration.

One advantage of the multispectral techniques of the present invention is the ability to detect genotypic responses across and within the water treatments. Soil and vegetation have unique spectral characteristics (i.e. reflection, transmission, and absorption of light) that enable very accurate separation when using multiple bands of energy. The different behavior of soil and vegetation allow for computer enhancement and removal of soil background and shadows. In addition, these bands of reflectance are less affected by environmental function than are thermal bands. Also because multiple bands are preferred and resulting calculations are based on multiple bands these reflective values are preferred for cross referencing of responses. This feature predicts increased utility of multiple band (multispectral) remote sensing techniques over thermal imagery. One means for collecting reflectance for these bands is through High Resolution Color Infrared (CIR) Photography.

The results from this example support the use of data obtained by remote sensing to elucidate environmental effects on plant germplasm. The focus of this approach has been the assessment of genotypic variation for physiological activity and status. The assessment of these genotypic responses under different water regimes and the correlation of these responses to physiological and agronomic performance has provided insight into the complex nature of environmental interactions in corn germplasm and permits selection of corn plants for breeding or advancement in order to predictably improve plant performance.

Presented in this example are genotypic differences for canopy reflectance of the three bands for the 24 hybrid grown under limited irrigation. Highly significant genotypic variation was detected for canopy reflectance for the green, red and near infrared bands for the hybrids grown under stress. (Tables 9–11). Computer generated images for each waveband are presented in FIGS. 6–8. Detailed plot diagram is presented in FIG. 1. All images illustrate qualitative differences across the plots. Significant correlations between yield (Table 4) of these hybrids grown under stress conditions to canopy reflectance in the green, red and near infrared bands were detected. Significant negative correlations were observed between hybrid yield and the green (−0.20*), red (−0.24**), near infrared (−0.18*). In addition, significant correlations ($P \leq 0.01^{**}$, 0.05*) were detected between near infrared reflectance and the degree of leaf rolling (+0.22*) and photosynthetic activity (+0.19**).

TABLE 8

Remotely sensed canopy temperatures of 24 hybrids grown under irrigated and limited irrigation conditions

| Hybrid | Canopy Temperatures (° C.)[1] | |
| --- | --- | --- |
| | Irrigated | Stressed |
| HA8502E.LH132 | 27.31 j | 28.36 cdefg |
| B73Ht.MBSU | 27.42 ij | 28.32 defgh |
| P3377 | 27.47 hij | 28.08 ghi |
| P3417 | 27.56 ghij | 28.57 abcd |
| F204.HBA1 | 27.57 ghij | 28.04 hi |
| T1100 | 27.62 fghij | 27.97 i |
| LH132.NL126A | 27.68 efghi | 28.30 defgh |
| DADG48.LH38 | 27.72 efghi | 28.64 abc |
| LH82.LHE136 | 27.76 defgh | 28.69 ab |
| P3343 | 27.77 defgh | 28.09 ghi |
| LH119.LH59 | 27.80 cdefg | 28.27 defghi |
| P3379 | 27.81 cdefg | 28.75 a |
| P3362 | 27.84 cdefg | 28.47 abcde |
| 4971A.NL005 | 27.93 cdef | 28.17 efghi |
| 8F036.LA021 | 27.96 cde | 28.36 cdefgh |
| 9860C.LH132 | 27.97 cde | 28.46 abcde |
| P3503 | 27.99 cde | 27.96 i |
| LH119.LH51 | 28.07 bcd | 28.35 cdefgh |
| LH51.LH74 | 28.09 abc | 28.46 abcde |
| DCD1.LH51 | 28.11 abc | 28.42 bcdef |
| F204.LH51 | 28.34 ab | 28.41 bcdef |
| 8F036.LH38 | 28.36 ab | 28.14 fghi |
| 6F541.MBSU | 28.38 ab | 28.18 efghi |
| 4971A.LH132 | 28.41 a | 27.98 i |
| Mean | 27.87 | 28.31 |
| Prob > F | .0001 | .0001 |
| LSD | .32 | .33 |
| CV (%) | 1.86 | 1.80 |

[1]Means within a column followed by the same letter are not significantly different according to the Least Significant Difference (LSD) multiple means comparison test.

TABLE 9

Green canopy reflectance means for twenty four hybrids grown under limited irrigation. Values are for a digitized high altitude photograph with no calibration but with soil and shadow masking[1]

| HYBRIDS | MEAN | |
| --- | --- | --- |
| 6F541.MBSU | 61.62 | a |
| HA8502E.LH132 | 58.98 | ab |
| P3362 | 58.02 | b |
| P3379 | 57.74 | b |
| LH51.LH74 | 57.63 | bc |
| B73Ht.MBSU | 56.92 | bc |
| 4971A.LH132 | 54.60 | cd |
| DCD1.LH51 | 52.61 | de |
| LH132.NL126A | 51.65 | def |
| DADG48.LH38 | 50.65 | efg |
| F204.LH51 | 50.42 | efgh |
| T1100 | 50.28 | efgh |
| 8F036.LH38 | 49.51 | fghi |

TABLE 9-continued

Green canopy reflectance means for twenty four hybrids grown under limited irrigation. Values are for a digitized high altitude photograph with no calibration but with soil and shadow masking[1]

| HYBRIDS | MEAN | |
| --- | --- | --- |
| 8F036.LA021 | 49.12 | fghi |
| P3377 | 48.85 | fghi |
| LH119.LH51 | 48.68 | fghi |
| F204.HBA1 | 48.27 | ghi |
| 4971A.NL005 | 48.14 | ghi |
| 98609C.LH132 | 47.45 | hij |
| LH119.LH59 | 46.85 | ijk |
| LH82.LHE136 | 46.50 | ijk |
| P3417 | 44.82 | jkl |
| P3503 | 43.82 | kl |
| P3343 | 43.14 | l |
| Prob > F = 0.0001 | | |
| LSD = 3.09 | | |
| CV = 4.81% | | |

[1]Means within a column followed by the same letter are not significantly different according to the Least Significant Difference (LSD) multiple means comparison test.

TABLE 10

Red canopy reflectance means for twenty four hybrids grown under limited irrigation. Values are from a digitized high attitude photograph with no calibration but with soil and shadow masking.

| HYBRIDS | MEAN | |
| --- | --- | --- |
| 6F541.MBSU | 63.73 | a |
| P3362 | 61.87 | ab |
| B73Ht.MBSU | 61.32 | ab |
| HA8502E.LH132 | 60.76 | ab |
| LH51.LH74 | 60.46 | b |
| P3379 | 60.21 | bc |
| 4971A.LH132 | 57.34 | cd |
| DADG48.LH38 | 56.52 | de |
| F204.LH51 | 56.50 | de |
| T1100 | 55.53 | def |
| DCD1.LH51 | 55.50 | def |
| LH132.NL126A | 54.88 | def |
| 8F036.LA021 | 54.88 | def |
| P3377 | 54.85 | def |
| LH119.LH51 | 54.84 | def |
| 98609C.LH132 | 54.55 | def |
| LH82.LHE136 | 54.30 | defg |
| 8F036.LH38 | 54.27 | defg |
| F204.HBA1 | 54.20 | efg |
| 4971A.NL005 | 53.93 | efgh |
| LH119.LH59 | 53.00 | fgh |
| P3417 | 52.77 | fgh |
| P3503 | 51.19 | gh |
| P3343 | 51.00 | h |

Prob > F = 0.0001
LSD = 3.11
CV = 4.41%
[1]Means within a column followed by the same letter are not significantly different according to the Least Significant Difference (LSD) multiple means comparison test.

TABLE 11

Near-Infrared canopy reflectance means for twenty four hybrids grown under limited irrigation. Values are from a digitized high altitude photograph with no calibration but with soil and shadow masking.[1]

| HYBRIDS | MEAN | |
| --- | --- | --- |
| HA8502E.LH132 | 76.001 | a |
| 6F541.MBSU | 75.124 | ab |
| LH51.LH74 | 74.173 | bc |

TABLE 11-continued

Near-Infrared canopy reflectance means for twenty four hybrids grown under limited irrigation. Values are from a digitized high altitude photograph with no calibration but with soil and shadow masking.[1]

| HYBRIDS | MEAN | |
|---|---|---|
| DCD1.LH51 | 73.793 | bcd |
| P3362 | 73.384 | bcd |
| 4971A.LH132 | 73.278 | cd |
| B73Ht.MBSU | 73.129 | cd |
| LH132.NL126A | 72.483 | cd |
| P3379 | 72.283 | de |
| F204.LH51 | 70.627 | ef |
| T1100 | 70.036 | fg |
| DADG48.LH38 | 69.987 | fg |
| 8F036.LH38 | 69.816 | fg |
| LH119.LH51 | 69.796 | fg |
| F204.HBA1 | 69.702 | fg |
| 4971A.NL005 | 69.681 | fg |
| P3377 | 69.313 | fg |
| LH119.LH59 | 68.891 | fgh |
| 8F036.LA021 | 68.771 | gh |
| 98609C.LH132 | 67.516 | h |
| LH82.LHE136 | 65.731 | i |
| P3417 | 65.445 | i |
| P3503 | 64.387 | j |
| P3343 | 64.288 | i |

Prob > F = 0.0001
LSD = 1.77
CV = 2.01%
[1]Means within a column followed by the same letter are not significantly different according to the Least Significant Difference (LSD) multiple means comparison test.

In order to reveal more relationships in the data, a form of factor analysis, principal component analysis (See Materials and Methods) was run on the multispectral information for each subplot. Principal component analysis was performed on reflectance values extracted from the high altitude photograph of the plot. This photograph was selected because the entire area of growing plants of interest was captured in a single frame. In order to eliminate any artifact associated with the image enhancement steps, principal component analysis was performed on three stepwise levels of reflectance data associated with the enhancement process. Principal component analysis was performed on the digitized high altitude photograph which upon digitization had three different types of processing: 1) no calibration or masking of soil and shadow effects; 2) calibration but no masking of soil and shadow effects; and 3) calibration and masking of soil and shadow effects. Calibration means accounting for distortions associated with the lens of the camera. A computer generated composite of a principal component analysis is present in FIG. 9.

Highly significant genotypic differences were detected for principal components 1 and 2 for each level of image enhancement (Tables 12–17). Interpretation of the principal components is as follows. It is considered that principal component 1 estimates a quantity item of the scene image that is being processed and analyzed. For the images in question, these most likely are factors relating to overall biomass or leaf area since canopy closure had occurred. Principal component 2 is believed to give an estimate as to quality factors of principal component 1. In the case of the image under consideration, this may be plant quality, stress or physiological condition. Given the diversity of genetic materials in this study, it is not surprising to detect significant differences for quantity or quality of plant material. However, despite these differences for principal components 1 and 2, no strong significant relationships to yield level was observed at any level of image processing. Through the use of remote sensing many types of information regarding a subplot are collected and available for manipulation. In the case of the principal component analysis, greater than 10,000 pixels of reflectance measures were used in the computations for each subplot. Because each subplot essentially is represented by populations of reflectance, then possibly the variations of the reflectance parameters as generated by canopy variation as a function of genotype may hold some useful information.

Analysis of variance as well as mean separation was performed on the standard deviations associated with principal components 1 and 2. Significant and highly significant hybrid differences were detected for the standard deviations for both of the principal components (Tables 18–23). These results were interpreted to mean that hybrids differ in their ability to maintain a homogenous canopy as measured by remotely sensed multispectral reflectance under the conditions present in the example.

Highly significant negative correlations were discovered between hybrid yield expression and the standard deviation for principal component 2 for all three levels of image enhancement. The correlation coefficients between the standard deviation and yield were −0.58, −0.61 and −0.57 for image enhancement levels 1, 2 and 3, respectively. These highly significant relationships indicate that the level of canopy reflectance variability associated with plant quality was related to genotypic yield expression. The interpretation of this relationship is that the cause of increased variance of canopy reflectance is associated with increased canopy disruption or breakdown under stress which results in the ultimate expression of reduced yield. For hybrids maintaining canopy homogeneity, as measured by reflectance variability high yield expression is realized. These interpretations are consistent with the understanding of the plant quality aspects of principal component 2. The reflectance measurements were taken during the mid to late vegetative stage and were predictive of the performance of the hybrids over the entire season.

Remote sensing techniques treat a canopy essentially as a continuum, assessing its intactness and functionality for light interception and use. In the situation of dealing with multispectral data, because large quantities of information are collected and analyzed on an individual subplot, the variability or population of the reflectance features in themselves becomes a measurable trait.

As can be seen from Example 3, significant genotypic differences were detected for canopy spectral reflectance measured during the mid to late vegetative stage of development for the green, red and near infrared bands. These differences were detected for 24 hybrids grown under limited irrigation in one season. The multispectral canopy signatures were obtained from digitized high resolution color infrared photographs. Significant inverse correlations were observed between hybrid yield and the green (−0.20*) and red (−0.24) bands whereas a positive correlation was observed between hybrid yield level and near infrared reflectance (+0.22). A principal component analysis was performed utilizing the three bands of reflectance. Highly significant negative correlations (−0.58, −0.61, and −0.57) were detected using three levels of image enhancement, between the variability of the principal component believed to represent plant condition and hybrid yield expression.

The interpretation of this relationship is that the cause of increased reflectance within subplot variance is associated with increased canopy disruption or breakdown under stress.

For hybrids maintaining canopy homogeneity, higher yield expression was realized. Such remote sensing techniques treat a canopy as an organelle complex and measures the intactness and functionality of this matrix for light interception and use.

The results in Example 3 support the use of remote sensing techniques for measuring canopy characteristics in plant breeding and evaluation programs and indicate that certain aspects of canopy reflectance and thermal emissions (Examples 1 and 2) have predictive power for identifying valuable plant traits such as yield.

TABLE 12

Principal Component 1 means for twenty four hybrids grown under limited irrigation. Reflectance parameters used in the PC analysis are from a digitized high altitude photograph with no calibration or soil/shadow masking.[1]

| HYBRIDS | MEAN | |
|---|---|---|
| 6F541.MBSU | 150.38 | a |
| P3362 | 145.74 | ab |
| HA8502E.LH132 | 144.98 | b |
| B73Ht.MBSU | 143.57 | b |
| P3379 | 142.26 | bc |
| LH51.LH74 | 141.19 | bc |
| 4971A.LH132 | 137.76 | cd |
| DCD1.LH51 | 135.10 | de |
| DADG48.LH38 | 134.95 | def |
| F204.LH51 | 133.50 | defg |
| LH132.NL126A | 131.61 | efgh |
| 4971A.NL005 | 131.45 | efgh |
| P3377 | 131.34 | efgh |
| 98609C.LH132 | 131.14 | efgh |
| T1100 | 131.07 | efgh |
| LH82.LHE136 | 130.83 | efgh |
| 8F036.LA021 | 130.31 | efgh |
| LH119.LH51 | 130.24 | efgh |
| 8F036.LH38 | 129.89 | fgh |
| F204.HBA1 | 129.64 | gh |
| P3417 | 129.53 | gh |
| LH119.LH59 | 128.97 | ghi |
| P3503 | 127.88 | hi |
| P3343 | 124.29 | i |

Prob > F = (0.0001)**
LSD = 5.10
CV = 3.02%
[1]Means within a column followed by the same letter are not significantly different according to the Least Significant Difference (LSD) multiple means comparison test.

TABLE 13

Principal Component 2 means for twenty four hybrids grown under limited irrigation. Reflectance parameters used in the PC analysis are from a digitized high altitude photograph with no calibration or soil/shadow masking.[1]

| HYBRIDS | MEAN | |
|---|---|---|
| LH82.LHE136 | 44.79 | a |
| P3503 | 44.76 | ab |
| P3417 | 44.75 | ab |
| P3343 | 44.69 | ab |
| 8F036.LA021 | 43.62 | abc |
| 98609C.LH132 | 43.34 | bcd |
| DADG48.LH38 | 43.10 | cd |
| P3377 | 43.02 | cd |
| 4971A.NL005 | 42.55 | cde |
| T1100 | 42.48 | cde |
| LH119.LH51 | 42.44 | cde |
| F204.HBA1 | 42.30 | cde |
| P3362 | 42.28 | cde |
| 8F036.LH38 | 42.25 | cde |
| P3379 | 42.25 | cde |

TABLE 13-continued

Principal Component 2 means for twenty four hybrids grown under limited irrigation. Reflectance parameters used in the PC analysis are from a digitized high altitude photograph with no calibration or soil/shadow masking.[1]

| HYBRIDS | MEAN | |
|---|---|---|
| LH119.LH59 | 42.16 | def |
| B73Ht.MBSU | 41.97 | defg |
| F204.LH51 | 41.97 | defg |
| 6F541.MBSU | 41.40 | efg |
| LH132.NL126A | 41.31 | efg |
| LH51.LH74 | 41.18 | efg |
| 4971A.LH132 | 40.73 | fgh |
| DCD1.LH51 | 40.55 | gh |
| HA8502E.LH132 | 39.69 | h |

Prob > F = (0.0001)
LSD = 1.45
CV = 2.72%
[1]Means within a column followed by the same letter are not significantly different according to the Least Significant Difference (LSD) multiple means comparison test.

TABLE 14

Principal Component 1 means for twenty four hybrids grown under limited irrigation. Reflectance parameters used in the PC analysis are from a digitized high altitude photograph with calibration but no masking of soil/shadow effects.[1]

| HYBRIDS | MEAN | |
|---|---|---|
| 6F541.MBSU | 139.45 | a |
| P3362 | 135.23 | ab |
| HA8502E.LH132 | 133.58 | b |
| B73Ht.MBSU | 132.89 | b |
| P3379 | 130.97 | bc |
| LH51.LH74 | 130.23 | bc |
| 4971A.LH132 | 125.25 | cd |
| DADG48.LH38 | 123.45 | de |
| DCD1.LH51 | 121.95 | def |
| F204.LH51 | 121.09 | defg |
| P3377 | 119.44 | defg |
| T1100 | 119.25 | efg |
| LH132.NL126A | 119.13 | efg |
| 4971A.NL005 | 119.13 | efg |
| LH82.LHE136 | 119.12 | efg |
| 98609C.LH132 | 118.82 | efg |
| 8F036.LA021 | 118.04 | efg |
| LH119.LH51 | 118.04 | efg |
| P3417 | 117.93 | efg |
| F204.HBA1 | 117.02 | fg |
| 8F036.LH38 | 116.89 | fgh |
| P3503 | 115.92 | gh |
| LH119.LH59 | 115.63 | gh |
| P3343 | 111.12 | h |

Prob > F = (0.0001)
LSD = 5.86
CV = 3.81%
[1]Means within a column followed by the same letter are not significantly different according to the Least Significant Difference (LSD) multiple means comparison test.

TABLE 15

Principal Component 2 means for twenty four hybrids grown under limited irrigation. Reflectance parameters used in the PC analysis are from a digitized high altitude photograph with calibration but no masking of soil/shadow effects.[1]

| HYBRIDS | MEAN | |
|---|---|---|
| P3343 | 44.618 | a |
| LH82.LHE136 | 44.231 | ab |

TABLE 15-continued

Principal Component 2 means for twenty four hybrids grown under limited irrigation. Reflectance parameters used in the PC analysis are from a digitized high altitude photograph with calibration but no masking of soil/shadow effects.[1]

| HYBRIDS | MEAN | |
|---|---|---|
| P3417 | 44.196 | ab |
| P3503 | 44.118 | abc |
| 8F036.LA021 | 42.791 | bcd |
| 98609C.LH132 | 42.629 | cde |
| P3377 | 42.028 | def |
| DADG48.LH38 | 41.966 | defg |
| LH119.LH51 | 41.511 | defgh |
| 4971A.NL005 | 41.509 | defgh |
| LH119.LH59 | 41.431 | defgh |
| 8F036.LH38 | 41.332 | defghi |
| F204.HBA1 | 41.306 | defghi |
| T1100 | 41.246 | efghi |
| F204.LH51 | 40.906 | fghij |
| P3379 | 40.717 | fghijk |
| P3362 | 40.450 | ghijkl |
| B73Ht.MBSU | 40.300 | hijkl |
| LH132.NL126A | 39.891 | ijkl |
| 6F541.MBSU | 39.489 | jkl |
| LH51.LH74 | 39.290 | kl |
| 4971A.LH132 | 39.210 | kl |
| DCD1.LH51 | 39.021 | lm |
| HA8502E.LH132 | 37.525 | m |

Prob > F = (0.0001)
LSD = 1.54
CV = 2.96%
[1]Means within a column followed by the same letter are not significantly different according to the Least Significant Difference (LSD) multiple means comparison test.

TABLE 16

Principal Component 1 means for twenty four hybrids grown under limited irrigation. Reflectance parameters used in the PC analysis are from a digitized high altitude photograph with calibration and masking of soil/shadow effects.[1]

| HYBRIDS | MEAN | |
|---|---|---|
| 6F541.MBSU | 190.00 | a |
| HA8502E.LH132 | 185.18 | ab |
| P3362 | 184.47 | ab |
| LH51.LH74 | 183.00 | b |
| B73Ht.MBSU | 182.37 | b |
| P3379 | 181.73 | b |
| 4971A.LH132 | 174.77 | c |
| DADG48.LH38 | 170.55 | cd |
| DCD1.LH51 | 169.19 | cde |
| F204.LH51 | 168.37 | def |
| LH132.NL126A | 167.69 | def |
| T1100 | 165.52 | defg |
| P3377 | 165.02 | defg |
| LH119.LH51 | 164.49 | defg |
| 4971A.NL005 | 163.65 | efg |
| 8F036.LA021 | 163.46 | efg |
| 98609C.LH132 | 163.01 | fg |
| F204.HBA1 | 162.69 | fg |
| 8F036.LH38 | 162.61 | fg |
| LH119.LH59 | 161.52 | g |
| P3417 | 160.85 | g |
| LH82.LHE136 | 160.13 | gh |
| P3503 | 154.31 | hi |
| P3343 | 152.34 | i |

Prob > F = (0.0001)
LSD = 6.08
CV = 2.86%
[1]Means within a column followed by the same letter are not significantly different according to the Least Significant Difference (LSD) multiple means comparison test.

TABLE 17

Principal Component 2 means for twenty four hybrids grown under limited irrigation. Reflectance parameters used in the PC analysis are from a digitized high altitude photograph with calibration and masking of soil/shadow effects.[1]

| HYBRIDS | MEAN | |
|---|---|---|
| P3417 | 48.35 | a |
| LH82.LHE136 | 48.30 | a |
| P3343 | 48.28 | a |
| P3503 | 47.83 | ab |
| 98609C.LH132 | 46.85 | abc |
| 8F036.LA021 | 46.74 | abcd |
| DADG48.LH38 | 46.31 | bcde |
| P3377 | 46.07 | cdef |
| P3379 | 45.88 | cdef |
| P3362 | 45.51 | cdef |
| LH119.LH51 | 45.43 | cdef |
| B73Ht.MBSU | 45.43 | cdef |
| F204.HBA1 | 45.42 | cdef |
| T1100 | 45.34 | cdef |
| LH119.LH59 | 45.28 | cdef |
| F204.LH51 | 45.18 | cdefg |
| 4971A.NL005 | 45.12 | defgh |
| 8F036.LH38 | 45.09 | defgh |
| 6F541.MBSU | 44.77 | efgh |
| LH51.LH74 | 44.41 | fghi |
| LH132.NL126A | 43.52 | ghij |
| 4971A.LH132 | 43.40 | hij |
| HA8502E.LH132 | 42.80 | ij |
| DCD1.LH51 | 42.65 | j |

Prob > F = (0.001)
LSD = 1.73
CV = 3.02%
[1]Means within a column followed by the same letter are not significantly different according to the Least Significant Difference (LSD) multiple means comparison test.

TABLE 18

Standard derivation means for Principal Components 1 for twenty four hybrids grown under limited irrigation. Reflectance parameters used in the PC analysis are from a digitized altitude photograph with no calibration or soil/shadow masking.[1]

| HYBRIDS | MEAN | |
|---|---|---|
| P3503 | 31.59 | a |
| LH82.LHE136 | 29.93 | ab |
| B73Ht.MBSU | 29.34 | abc |
| P3417 | 29.08 | abc |
| P3377 | 28.85 | abcd |
| HA8502E.LH132 | 28.79 | abcd |
| 6F541.MBSU | 28.71 | abcd |
| 98609C.LH132 | 28.63 | abcd |
| F204.HBA1 | 28.61 | abcd |
| P3343 | 28.57 | abcd |
| P3362 | 28.36 | abcd |
| 8F036.LH38 | 28.30 | abcd |
| 4971A.NL005 | 28.10 | bcd |
| T1100 | 27.86 | bcd |
| DADG48.LH38 | 27.63 | bcd |
| F204.LH51 | 27.49 | bcd |
| 4971A.LH132 | 27.23 | bcd |
| DCD1.LH51 | 27.15 | bcd |
| LH119.LH59 | 26.97 | bcd |
| 8F036.LA021 | 26.82 | bcd |
| P3379 | 26.74 | bcd |
| LH119.LH51 | 26.55 | cd |

TABLE 18-continued

Standard derivation means for Principal Components 1 for twenty four hybrids grown under limited irrigation. Reflectance parameters used in the PC analysis are from a digitized altitude photograph with no calibration or soil/shadow masking.[1]

| HYBRIDS | MEAN | |
|---|---|---|
| LH51.LH74 | 25.69 | d |
| LH132.NL126A | 25.57 | d |

Prob > F = (0.29)
LSD = 3.35
CV = 9.5%
[1]Means within a column followed by the same letter are not significantly different according to the Least Significant Difference (LSD) multiple means comparison test.

TABLE 19

Standard deviation means for Principal Components 2 for twenty four hybrids grown under limited irrigation. Reflectance parameters used in the PC analysis are from a digitized high altitude photograph with no calibration or soil/shadow masking.[1]

| HYBRIDS | MEAN | |
|---|---|---|
| DCD1.LH51 | 5.219 | a |
| LH132.NL126A | 5.214 | ab |
| 6F541.MBSU | 5.052 | abc |
| 4971A.NL005 | 4.940 | abc |
| 4971A.LH132 | 4.923 | abcd |
| 8F036.LH38 | 4.864 | abcd |
| B73Ht.MBSU | 4.843 | abcd |
| LH119.LH51 | 4.747 | abcde |
| DADG48.LH38 | 4.735 | abcde |
| P3377 | 4.713 | abcdef |
| T1100 | 4.699 | abcdef |
| F204.LH51 | 4.696 | abcdef |
| LH51.LH74 | 4.654 | bcdef |
| HA8502E.LH132 | 4.605 | cdefg |
| F204.HBA1 | 4.580 | cdefg |
| P3362 | 4.543 | cdefg |
| LH119.LH59 | 4.536 | cdefg |
| 8F036.LA021 | 4.495 | cdefg |
| P3379 | 4.374 | defg |
| P3417 | 4.257 | efg |
| 98609C.LH132 | 4.223 | efg |
| P3343 | 4.168 | fg |
| P3503 | 4.084 | g |
| LH82.LHE136 | 4.043 | g |

Prob > F = (0.005)
LSD = 0.56
CV = 9.68%
[1]Means within a column followed by the same letter are not significantly different according to the Least Significant Difference (LSD) multiple means comparison test.

TABLE 20

Standard deviation means for Principal Component 1 for twenty four hybrids grown under limited irrigation. Reflectance parameters used in the PC analysis are from a digitized high altitude photograph with calibration but no masking of soil/shadow effects.[1]

| HYBRIDS | MEAN | |
|---|---|---|
| P3503 | 35.87 | a |
| LH82.LHE136 | 34.27 | ab |
| B73Ht.MBSU | 33.03 | abc |
| P3417 | 32.92 | abc |
| P3377 | 32.65 | abcd |
| 98609C.LH132 | 32.59 | abcd |
| HA8502E.LH132 | 32.58 | abcd |
| 6F541.MBSU | 32.54 | abcd |
| P3362 | 32.38 | abcd |

TABLE 20-continued

Standard deviation means for Principal Component 1 for twenty four hybrids grown under limited irrigation. Reflectance parameters used in the PC analysis are from a digitized high altitude photograph with calibration but no masking of soil/shadow effects.[1]

| HYBRIDS | MEAN | |
|---|---|---|
| F204.HBA1 | 32.35 | abcd |
| P3343 | 32.33 | abcd |
| 8F036.LH38 | 32.09 | abcd |
| 4971A.NL005 | 32.06 | abcd |
| T1100 | 31.74 | bcd |
| DAG48.LH38 | 31.54 | bcd |
| F204.LH51 | 31.25 | bcd |
| DCD1.LH51 | 31.10 | bcd |
| 4971A.LH132 | 31.07 | bcd |
| LH119.LH59 | 30.84 | bcd |
| 8F036.LA021 | 30.56 | bcd |
| P3379 | 30.27 | cd |
| LH119.LH51 | 30.13 | cd |
| LH132.NL126A | 29.24 | cd |
| LH51.LH74 | 29.02 | d |

Prob > F = (0.2705)
LSD = 3.87
CV = 9.68%
[1]Means within a column followed by the same letter are not significantly different according to the Least Significant Difference (LSD) multiple means comparison test.

TABLE 21

Standard deviation means for Principal Component 2 for twenty four hybrids grown under limited irrigation. Reflectance parameters used in the PC analysis are from a digitized high altitude photograph with calibration but no masking of soil/shadow effects.[1]

| HYBRIDS | MEAN | |
|---|---|---|
| 6F541.MBSU | 5.912 | a |
| LH132.NL126A | 5.892 | a |
| DCD1.LH51 | 5.868 | ab |
| 4971A.LH132 | 5.599 | abc |
| B73Ht.MBSU | 5.546 | abc |
| 4971A.NL005 | 5.525 | abc |
| 8F036.LH38 | 5.508 | abc |
| HA8502E.LH132 | 5.318 | abcd |
| LH119.LH51 | 5.307 | abcd |
| LH51.LH74 | 5.303 | abcde |
| DADG48.LH38 | 5.288 | abcde |
| P3377 | 5.278 | abcde |
| F204.LH51 | 5.193 | bcdef |
| F204.HBA1 | 5.190 | bcdef |
| T1100 | 5.111 | cdef |
| LH119.LH59 | 5.096 | cdef |
| P3362 | 5.090 | cdef |
| 8F036.LA021 | 5.076 | cdef |
| P3379 | 5.068 | cdef |
| P3343 | 4.759 | defg |
| P3417 | 4.663 | defg |
| 98609C.LH132 | 4.622 | efg |
| P3503 | 4.535 | fg |
| LH82.LHE136 | 4.272 | g |

Prob > F = (0.0001)
LSD = 0.68
CV = 10.45%
[1]Means within a column followed by the same letter are not significantly different according to the Least Significant Difference (LSD) multiple means comparison test.

TABLE 22

Standard deviation means for Principal Component 1 for twenty four hybrids grown under limited irrigation. Reflectance parameters used in the PC analysis are from a digitized high altitude photograph with calibration and soil/shadow masking.[1]

| HYBRIDS | MEAN | |
|---|---|---|
| 6F541.MBSU | 28.506 | a |
| HA8502E.LH132 | 27.673 | ab |
| B73Ht.MBSU | 27.422 | abc |
| P3379 | 27.314 | abcd |
| P3377 | 26.929 | abcde |
| P3362 | 26.786 | abcde |
| P3503 | 26.676 | abcde |
| P3417 | 26.511 | bcdef |
| 98609C.LH132 | 26.478 | bcdef |
| DADG48.LH38 | 26.436 | bcdef |
| P3343 | 26.423 | bcdef |
| T1100 | 26.360 | bcdef |
| 8F036.LH38 | 26.139 | bcdef |
| F204.HBA1 | 26.041 | bcdefg |
| LH119.LH59 | 25.584 | cdefgh |
| LH51.LH74 | 25.580 | cdefgh |
| LH82.LHE136 | 25.565 | cdefgh |
| 8F036.LA021 | 25.417 | defgh |
| 4971A.LH132 | 25.379 | efgh |
| F204.LH51 | 25.324 | efgh |
| LH119.LH51 | 25.127 | efgh |
| LH132.NL126A | 24.674 | fgh |
| 4971A.NL005 | 24.198 | gh |
| DCD1.LH51 | 23.765 | h |

Prob > F = (0.0007)
LSD = 1.93
CV = 5.88%
[1]Means within a column followed by the same letter are not significantly different according to the Least Significant Difference (LSD) multiple means comparison test.

TABLE 23

Standard deviation means for Principal Component 2 for twenty four hybrids grown under limited irrigation. Reflectance parameters used in the PC analysis are from a digitized high altitude photograph with calibration and soil/shadow masking.[1]

| HYBRIDS | MEAN | |
|---|---|---|
| LH132.NL126A | 4.645 | a |
| DCD1.LH51 | 4.631 | ab |
| LH119.LH51 | 4.448 | abc |
| 8F036.LH38 | 4.446 | abc |
| 6F541.MBSU | 4.431 | abc |
| 4971A.NL005 | 4.369 | abcd |
| DADG48.LH38 | 4.318 | abcd |
| F204.HBA1 | 4.299 | abcde |
| 8F036.LA021 | 4.258 | abcde |
| T1100 | 4.256 | abcde |
| LH119.LH59 | 4.240 | abcde |
| 4971A.LH132 | 4.218 | abcde |
| F204.LH51 | 4.209 | abcde |
| P3377 | 4.188 | abcde |
| LH51.LH74 | 4.126 | abcde |
| HA8502E.LH132 | 4.126 | abcde |
| P3343 | 4.123 | abcde |
| P3379 | 4.103 | abcde |
| B73Ht.MBSU | 4.071 | bcde |
| P3503 | 3.928 | cdef |
| P3417 | 3.848 | def |
| 98609C.LH132 | 3.819 | def |
| P3362 | 3.753 | ef |
| LH82.LHE136 | 3.503 | f |

Prob > F = (0.0241)
LSD = 0.56
CV = 10.73%
[1]Means within a column followed by the same letter are not significantly different according to the Least Significant Difference (LSD) multiple means comparison test.

EXAMPLE 4

Use of Remotely Sensed Canopy Characteristics for the Accelerated Advancement of Germplasm Through Plant Breeding and Evaluation Programs An important factor for commercial plant breeding and evaluation programs is the identification of improved segregants as early in the breeding process as possible. Segregants refer to genotypic classes of offspring of parental plant line crosses. If the parents do not possess identical genotypes, their genes will be sorted into offspring in different combinations. Segregation ratios may be predicted if parental genotypes are known (e.g., Mendelian inheritance), or may sometimes be inferred from phenotypic differences among offspring, and among offspring and parents. If two inbred parental lines are crossed, the progeny produced are referred to collectively as the $F_1$ generation.

Early classification of superior segregants by remote sensing technology allows for the acceleration of selection of the superior plants as parents of subsequent generations, and incorporation of improved genetic material through the breeding process, by allowing focused resources to be placed on the improved segregants. Cost reduction results.

In corn and sorghum, early generation testing is performed in order to screen for segregants having superior combining ability (yield capacity expression) along with other important commercial traits, when crossed to the appropriate tester. A plant line may be initiated in a variety of ways. For corn and sorghum, the lines of commercial interest are generally hybrids produced by the combination of the haploid genetic complements of parental inbred lines. The most typical way to produce corn or sorghum hybrids is to cross-breed two inbred lines. Many inbred lines are available for this purpose. Some are publicly available, others are proprietary. Selection of parental inbred lines to form hybrids is based on many factors. Among these factors are general combining ability, which is defined as the average performance of the inbred line in a series of hybrid combinations; phenotypic or previously determined genotypic characteristics of the inbred lines; and the degree of ancestral relationship (in general, the more distant the ancestral relationship of the inbred lines, the more likely the offspring are to exhibit heterosis, enhanced values of a trait when compared with either parent). For self-pollinating plants, for example, wheat, barley, soybeans, direct evaluation of plants is routine, rather than evaluation of progeny by testcrossing. For highly cross-pollinated plants such as maize which can be artificially self-pollinated, traits that do not show heterosis may be directly evaluated.

Indirect evaluation of traits which are to be improved by breeding, from early generation testing by the methods disclosed herein shortens the time for decision making, thereby decreasing the interval between research and commercialization of plants.

The first self pollinated generation, e.g. if corn is being bred, or next after the $F_1$ is the $F_2$. There may be n generations: $F_2 \ldots F_n$. (Some prefer the terms $S_2 \ldots S_n$.) Generations occurring after any specified reference generation are also termed "advanced generations," relative to the reference generation. Any generation with a lower generation number is an "earlier" generation to a subsequent one.

At any subsequent or advanced generation, a sample of the descendant line plants may be cross-bred to a tester line to evaluate the combining ability of the descendant lines and to quantitatively assess at least one numerically representable phenotypic trait of the lines. A tester may be defined as a standard parental line with well-known characteristics. The mean value for each (line x tester) combination is determined. For some types of self-pollinating lines, e.g., soybeans, direct evaluation is typical. Basically, the purpose of the testcross when used in the method of the present invention is to evaluate the combining ability (hybrid performance capabilities) of the lines.

The testers may be inbred lines, single, double, or multiple cross hybrids, or any other assemblage of plants produced or maintained by controlled or free mating, or any combination thereof. Inbred line testers are those now most commonly used in practice. Research has indicated that testcross results from utilization of a single inbred tester may be generally applicable in prediction of crosses to other inbred lines. (A review and citation of pertinent literature regarding the techniques and purposes of testcrossing, in particular of early generation testcrossing, and of indirect selection can be found in: Hallauer, et al., 1988.) For some self-pollinating plants, direct evaluation without progeny testing is preferred.

To evaluate the testcrosses for the trait(s) of interest, a suitably designed field trial is grown at one or more locations for one or more years. Such trials are conducted by measuring values of plants grown in specific "blocks" to control variance due to environmental factors such as soil type, drainage, and soil water holding capacity, and are replicated to the extent necessary to contain plot error variance within limits commonly accepted by those skilled in the art. Given the success illustrated in Examples 1–3 for hybrid classification using remote sensing techniques, and relating this classification to yield expression, a logical application of remotely sensed canopy characteristics is as screening assays for yield expression in trials aimed at selecting for improved yield.

Genotypes grown widely across a large geographic area are each year invariably afflicted by drought and heat stress that varies in frequency and intensity due to vagaries of weather patterns. In any given year, pockets of drought varying in size, duration, and intensity almost always appear. Thus, one major factor in limiting the productivity of a genotype over a wide geographic area is susceptibility to heat and drought stress.

Heretofore, two methods for assessing genotypic response to drought stress have been employed: (a) evaluating genotypic performance in test plots scattered over the relevant geographic area so as to sample drought distribution patterns in parallel with that experienced by the extant crop; or (b) assessing productivity under conditions of little or no irrigation in typically arid regions. The first method's principal drawback is that, in order to ensure adequate sampling of the environment so as to obtain an unbiased estimate of drought stress response germane to the geographic area in question, tests at many locations over several years must be conducted. In the second method, the region of testing is often not the region of intended commercial distribution. Hence, the observed drought stress response may be confounded by factors peculiar to the region of testing. The present invention is a more accurate and efficient method of determining genotypic response to drought stress.

Reflectance measurements, according to the present invention, are unbiased indicators (predictors) of "average" yield response to stress. Consequently, these measurements are equivalent in value to several years of testing at many locations per year because, as noted above, strictly empirical evaluation necessitates testing for several years at many locations each year. Moreover, they are unconfounded by extraneous environmental factors incident to the testing location.

To accomplish this shortened evaluation, $S_2$ plant lines are crossed onto testers in replicated trials. In addition to performance information, canopy reflectance and emission characteristics are measured by remote sensing at several stages of vegetative and reproductive development.

$S_2$ lines with favorable testcross reflectance and/or emission patterns are advanced based on such information combined with other agronomic information. Both remote sensing data and agronomic information are combined in a selection index consisting of a weighted average of the remote sensing data and the agronomic data.

The remote sensing data and agronomic data are collected in the summer, and the hybrids having above average performance based upon this selection index are advanced in the winter onto more testers. This allows for more extensive evaluation of the survivors the following summer.

Thus, fixing of stress response via selection based on reflectance criteria at the outset of the screening process permits greater selection intensity on other factors of genotypic interaction with the environment in subsequent performance tests, further accelerating the breeding programs.

Breeding programs incorporating decisions based on remote sensing evaluation early in crop development result in earlier development and identification of improved soybeans due to an earlier focus or reading of germplasm in the evaluation programs.

Early identification of superior plants permits imposition of a higher selection threshold early in the evaluation process. Consequently, only desirable segregants are carried into advanced testing, therefore, saving considerable expense and allowing allocation of testing resources to be focussed on the set of identifiably superior survivors.

EXAMPLE 5

Use of Remote sensing Technology to Improve Soybean Breeding

Of critical importance to soybean breeding and evaluation is the ability to test selections across a range of environments. Wide area testing allows for an estimate of general stress reaction of breeding selections.

Because soybeans are self-pollinated plants, the resultant segregants of a breeding cross are critically limited by seed supply. This limitation exists until relatively late in the advancement process. Wide area testing of the descendant line plants is generally constrained by seed supply until bulking of seed. Bulking of seed is done after the genotype exhibits a uniform phenotype which is usually at the $F_7$ level. The use of remote sensing of canopy reflectance and emissions of soybeans of an earlier generation allows for a means by which to assess general stress reaction at substantially earlier stages of development. Advantages of this results, in addition to earlier identification of superior segregants, in improved selection intensity. Cost savings are due to focused testing of only superior segregants in subsequent testing. This facilitates the release and commercialization of new releases of improved soybeans.

In this example, seeds from a cross of elite *Glycine max* sources are crossed to produce an $F_1$. Early generation is advanced by single seed descent. The $F_1$ through $F_4$ selections are grown, e.g., in Hawaii, to facilitate the most rapid means of producing $F_5$ populations for evaluation in the Midwest. Utilizing this advancement scheme allows advancement from the initial cross to $F_5$ seed production in 15–18 months. Seed quantities are limited at the $F_5$ level such that only 1 row is preferably. In addition to selecting for yield and maturity, canopy reflectance and emissions are measured by the methods presented herein. More discreet band resolution may be obtained by the use of multispectral single-band video imaging Everitt et al. (1990) and mid-infrared video (Everitt et al., 1989). The selected lines based upon canopy signature will be advanced to the $F_6$ level during the following year. Still at this level only enough seed exists to plant replicated trials at 2 to 3 locations. Canopy characteristics are detected over these locations and additional selection is based on the canopy signature derived by the methods disclosed herein. After this selection process, the seed from the $F_7$ is bulked for further evaluation and production.

Breeding programs incorporating decisions based on remote sensing evaluation early in crop development result in earlier development and identification of improved soybeans due to an earlier focus or reading of germplasm in the evaluation programs.

Early identification of superior hybrids permits imposition of a higher selection threshold early in the evaluation process. Consequently, only desirable segregants are carried into advanced testing, therefore, saving considerable expense and allowing allocation of testing resources to be focussed on the set of identifiably superior survivors.

Materials and Methods
Irrigated and Limited Irrigated (Stress) Plant Material

Twenty-four hybrids (Table 1) were arranged in two independently randomized complete block designs (FIG. 1). Each cell shown in FIG. 1 includes an area equal to four rows of corn. The subplots are numbered as shown. A range is defined as 6 subplots being 24 rows wide. There were five replications of the irrigated and five of the stressed (limited irrigation) areas. (Rep. I–V on FIG. 1). There were 4 ranges to each replicate. Each replicate included one subplot of each of 24 different hybrids. The irrigated and stressed fields are independent experiments, therefore, hybrid planting patterns in the two fields are not identical; i.e., subplot 1 in each does not have the same hybrid. In each experiment, hybrids were randomly assigned to subplots in each replicate.

The border areas were planted with control plants with well-established performance and phenotypic traits. These areas serve as overall environmental conditions in the planted area. One design was used for each of the two water irrigation treatments. Each experimental design utilized five replications. In one water management treatment, irrigation was provided at normal intervals throughout the study when required. This treatment was referred to as the irrigated treatment. In the other water management plot, irrigation was discontinued at the seventh to eighth leaf stage of development. This treatment was referred to as the limited irrigated or stress treatment.

Each hybrid replicate consisted of four rows on 30 inch centers having a length of 20 feet. Alleyways between ranges were three to four feet. Average seedling emergence of the hybrids was noted in June, and plot stands were thinned back to a uniform population of equivalent to 24,000 plants/acre 1 week later. After another week, most of the hybrids were at the fourth to fifth leaf stage. After about three weeks, the plant material was at the seventh to eighth leaf stage. The limited irrigated plot was last irrigated at the end of three weeks and received no rain or irrigation until after another 3 weeks when a rainfall of four inches occurred. During this time, the irrigated plot received weekly applications of water. The irrigation treatments were made via a lateral move system (Lindsey Manufacturing) with overhead nozzles. Optimal cultural practices well known to those of skill in the art were used for plot management.

Cultural practices included incorporation of fertilizer in the fall (75 lbs. nitrogen 50 lbs. phosphorous, 30 lbs. potassium) followed by 140 lbs. anhydrous nitrogen during the growing season. Herbicide application was 3½ quarts/acre of Larriat. Soil type was a sandy-clay loam with 2.5% organic matter. Harvesting was done on the center two rows for each subplot once the grain moisture was estimated to be below 22%. Final yield was adjusted to 15.5% moisture.

Physiological Measurements

Plant water relations were determined through the use of a pressure bomb with the cut edge protruding out through a rubber grommet. A model #3005 plant water status console (Soil Moisture Equipment Corp., Santa Barbara, Calif.) was used for this purpose. Leaf material was sampled from the upper most fully expanded sunlit leaves between 11:00 a.m. and 2:00 p.m. for each hybrid replication on a given day of measurement. Leaf material was removed from one side of the mid rib of the leaf. Prior to cutting the leaf tissue, a custom made plastic sleeve was slipped over the portion of the leaf selected for measurement. This prevented moisture loss from the leaf tissue during the measurement process. The cut leaf material was placed into the pressure chamber and snugly sealed with set screws which compress a grommet sealing system. The chamber was pressurized with nitrogen gas. Total water potential was measured at the pressure at which the water column within the tissue reached the cut surface of the leaf. Atmospheric units were measured in bars with 0.25 of 1% accuracy.

At the same time and on the same leaf as that used for total water potential measurement, a leaf sample was taken for determination of osmotic potential. A leaf sample was cut from the next section of the leaf moving up the leaf blade. A small portion was cut in order not to have any cavitation present in the sample and discarded. Then approximately a 1"×2½" portion of the leaf was placed into a plastic sleeve, cut, removed from the sleeve, washed in distilled water, dried and placed into a custom made plastic bag and heat sealed. (Seal-a-meal, model 6010 Dazey). The sample was then frozen on dry ice and kept frozen until osmotic potential determination. Osmotic potential determinations were made by placing thawed plant material in thermocouple psychrometers (model C-52 Wescor, Logan, Utah) operated by a custom built electronic scanner. Operating conditions were the following: cool time 10 seconds, cooling current 6.5 milliamps, delay time 7 seconds, scan interval every 20 mins. for a total of 7 scans. From this information the lowest consistent voltage output was compared against a standard curve of known osmotic relationships. Osmotic potentials were determined in duplicate for each plant sample and the mean was used for further calculations. The C-52 chambers were kept at 25° C. Turgor potential was calculated as the differential between total water potential and osmotic potential.

Leaf gas exchange measurements were recorded on the upper most fully expanded sunlit leaves between 11:00 AM and 2:00 PM. For this purpose a model ADC LCA-2 portable photosynthesis system (P.K. Morgan Instruments, Inc., Andover, Mass.) was used. The ADC LCA-2 is a battery operated portable system which combines a leaf chamber, air supply unit, infra-red gas analyzer, thermocouples, photodiodes and a data processor to record measurements of leaf photosynthesis, leaf transpiration, leaf stomatal conductance, leaf temperature, air temperature, air relative humidity, and photosynthetically active radiation. These measurements were recorded during conditions when sunlight intensity was approximately 2000 microEinsteins $m^{-2} sec^{-1}$. Leaf gas exchange measurements were recorded on approximately 6 $cm^2$ of leaf material for each hybrid replication on a given day of measurement.

Ground based measurements of leaf temperature were measured with a handheld infra-red gun. The measurements were made on the upper surface of sunlit leaves. Measurements were recorded on 5 separate samples of leaves for each hybrid replication between 11:00 AM and 2:00 PM. Each sample consisted of a leaf circle approximately 2 inches in diameter. All samples were recorded from a distance of approximately 1 foot from the canopy surface. A Scheduler* Infrared Plant Stress Monitor (Standard Oil Co., Chicago, Ill.) was used for this purpose.

During the period of time when leaf samples were collected for plant water relations, a visual score of leaf rolling was determined for each hybrid replication. A numerical scale was used to visually approximate the extent of rolled leaves on the plants. The rating scale ranged from 1, which was given to a plant with severe leaf rolling, to 5, which was given to a plant with flat leaves.

Leaf and Canopy Thermal Characteristics

The Space Remote Sensing Center, a NASA commercialization of Space Center, collected and processed the thermal and CIR images as directed.

Canopy temperatures of the subplots were collected using a thermal imaging system (Inframetric Model 600) mounted in a Cessna 172 airplane. The Cessna 172 airplane was equipped with camera ports. The equipment was mounted in a specially designed mount in which the sensor, sensor controller, video monitor for both black/white and color enhancement display, and VCR recorders were mounted in position on the right side of the airplane. The forward right hand seat was removed to allow for this configuration. One monitor was positioned for both pilot and operator view and another for operator view and adjustment. The camera which was connected via cable to the controller was mounted vertically over the port. Instrumentation was powered by batteries. Data of both grey scale and color output was stored on the VCR tape. Inframetric software records real time together with an audio channel recording of both cockpit and ground communications. A 1× lens was used. The emissivity was set at 1.0.

Collection of Canopy Thermal Imagery:

Prior to the actual flight collection the field was segmented into scanning lanes on a map. For purposes of this invention, scan widths were usually 12 to 16 rows wide and ran the length of the field. Scans were collected in-row direction or across-row direction. In-row direction of collection was preferred for references and plot definition.

Aluminum foil placards (29¾"×22½") were positioned at the first and the last rows of the scanning width in order to have a known reference number on the thermal image recorded on VCR type. Additional foil placards were placed at key points of reference throughout the scan length. The foil markers provided valuable aid for the location of specific rows and ranges in the image, i.e. for the location of a specific hybrid or genotype entry.

A ground crew directed the pilot into the appropriate scan and gave ambient air temperature information which was used to set the temperature setting on the inframetrics system. A 10 or 20° C. span setting is preferred at which the midpoint setting is the current air temperature. This setting will vary depending upon the degree or stage of water availability to the crop of interest. Under a more rainfed or irrigated condition, it may be necessary for the midpoint setting to be positioned up to 2–3° C. below air temperature. Under a more water limited condition, the temperature setting may have to be varied over air temperature. These settings are important for the collection of thermal imagery with the best dynamic range. The more accurate the settings, the more complete will be the image recorded for subsequent image analysis.

A person located on the ground communicated with the plane to direct it to the appropriate scan area.

The optimal time period for collection appeared to be between 11:00–4:00 pm under clear sky conditions. For accurate thermal image collection, clouds are preferably absent. If clouds move in during a scan, it is preferable to wait until the clouds clear and the canopy heats up.

Focussing of the inframetrics system was required. This is best done at the selected altitude and over clear, well defined objects (e.g., roads, houses).

A flight altitude of 175–250', depending upon the scan width, was used. This generally allowed for 30–32 rows to be in the field of view for the scanner sensor.

Generally, the scan width corresponded to 50% of the field of view of the camera. This allowed some side to side movement of the plane during the scanning period. Then a 10° C. span was selected.

Initially, it was preferred to take multiple scans at several temperature set points to allow for maximum image captures.

Processing Inframetrics Data

Appropriate scans, i.e. scans for which temperature settings were correct and the scan was intact, were selected from the overall collection of scans for further thermal quantification.

Selected frames of data showing the subplot of interest was transferred over to diskette. Analysis may be done directly on the VCR tape. However, the image that is transferred over to the diskette can be used for future reference. After soil background was removed from the image, the thermal data were processed using Inframetric software. Graphic polygons were manually drawn around each four row subplot or row within each. The following statistics were calculated for each four row or two row subplot. Statistics, if need be, can be extracted down to the row level with subplots, providing refined resolution.

1. Number of vegetation pixels.
2. Minimum temperature in image.
3. Maximum temperature in image.
4. Mean.
5. Standard Deviation.

6. Peak.

7. Skewness.

8. Time.

Color Infrared Photography

Positioned in the left camera port was a Hasselblad 500 ELM with a 50 back and 100 mm Zeiss Planer lens. High resolution 70 mm format color infrared film was loaded into the camera. This film type was a composite of 3 channels; blue, green and red, which represent green, red and near-infrared reflectance, respectively. Either before or after low level thermal scanning the color infra-red photography is taken at the appropriate altitude to allow for complete capture of the field of interest.

The reflectance portion of the spectrum (green, red, near infrared) was acquired once during the growing season. The color infrared photography was blown up and digitally scanned at the highest possible resolution. The data was digitally processed resulting in descriptive statistics for each subplot. Each processing technique used generated a unique set of statistics.

Output mainly consists of descriptive statistics. However, map products can be generated using an electrostatic plotter, a thermal plotter, or camera output (i.e. slides or photographs).

Vegetation Indices

In addition to using individual remotely sensed variables or combinations thereof, vegetation indices which are closely related to the leaf area index of the plant canopy (LAI), may be used. LAI is a principal morphological parameter of vegetation canopies which has been used in linking satellite derived vegetation index and photosynthesis through the absorbed photosynthetically active radiation (PAR). The relationship between normalized difference vegetation index (NPVI) and LAI varies between vegetation types, and even within one vegetation type. The NDVI is a measure of the photosynthetically active tissue in the canopy which dominates both photosynthesis and transpiration processes. (Rouse et al., 1974)

As leaf area index increases and the soil is gradually covered by the canopy, reflectance in the red region of the spectrum decreases while near-infrared reflectance increases. One of the spectral ratios available is the normalized difference vegetation index (NDVI) which is sensitive to vegetation activity. It is derived from the ratio of the red (R) and near infrared (NIR) spectral bands as follows:

$$NDVI = \frac{(NIR - R)}{(NIR + R)}$$

Although the NDVI is commonly used, various other indices have been proposed (Kauth and Thomas, 1976; Tucker, 1979; Jackson, 1983).

Data obtained by remote sensing of plant phenotypic traits may be converted to various indices related to vegetation parameters including leaf area index, biomass, percentage growth cover, attributes used to study photosynthesis, carbon budgets, water balance, and related terrestrial processes, (Goward et al., 1991). Vegetation indices (VI) generally combine information contained in two spectral bands: red and near-infrared. A purpose of such indices is to minimize the effect of external factors on spectral data and to derive canopy characteristics such as leaf area index (LAI) and the fraction of absorbed photosynthetic active radiation (PAR).

The goal of such data reduction is to reduce information, for example, from that obtained from four (MSS) or seven (TM) bands of data, to a single number per pixel that predicts or assesses plant canopy characteristics such as biomass, productivity, leaf area, and/or percent of the ground covered by vegetation.

The following vegetation indices are suitable for purposes of this invention:

$$ND = NIR - R / NIR + R$$

$$VI = NIR / R$$

$$TVI = (ND + .05)^{.5}$$

Where:
$ND$ = Normalized Difference
$NIR$ = Near Infrared
$R$ = Red
$VI$ = Vegetation Index
$TVI$ = Transformed Vegetation Index Measures of physiological parameters were collected using ground based instrumentation [plant water relation, leaf temperature, canopy, and other phenotypic traits as well as agronomic traits (yield, moisture, standability)]. These parameters together with remotely sensed thermal and reflectance data were analyzed using the appropriate analysis of variance tests and mean separation techniques (SAS statistical software was used). Correlation coefficients were generated between parameters to seek significant associations.

The resultant product is a large-scale screen for yield potential and other valuable traits among corn research trials. Results may be based on canopy temperature or reflectance factor(s) or a combination.

Statistical Methods

Analysis of Variance

The statistical methods used in the following examples include computation of means, variances, standard deviations, ranges and the like, for phenotypic traits. These methods are known to those of skill in the art. In addition, analysis of variance was regularly employed to determine differences among genotypes.

Analysis of variance is a statistical technique used to determine the components of the overall variance. In a simple case, the variance of plants of the same genotype grown in different environments will provide an estimate of the effects of environment. Factors contributing to the environmental variance include year of growth and differences in the soil composition of plots of land. Interaction also exists, for example, the phenotypes resulting from (genotype×location×year) combinations may vary non-additively.

Analysis of variance (ANOVA) is a statistical method wherein mean values of a variable may be compared among populations. Statistically significant differences among the means are detected by a statistical technique known as the F test. The basic method is to compare the amount of variance that is due to some difference among the populations, relative to differences that arise by chance. ANOVA is an arithmetic procedure for partitioning the total variance exhibited by a data set into recognizable sources of variation such as genotypes, soil differences, marker genotypes, and residual variation (experimental error). Various types of experimental design to which ANOVA is applied are discussed in Cochran and Cox, 1957 (e.g., randomized complete block designs, balanced incomplete block designs, and the like). If an analysis of variance is significant overall, pairwise comparisons of means may be made using, for example, the least significant difference (LSD) multiple means comparison technique.

Factor Analysis and Principal Components

Factor analysis is a method of data-reduction the purpose of which is to uncover an underlying pattern of relationships in data. Reduction of, for example, a large array of correlation coefficients, to a smaller set of factors or components that may be taken as source variables which account for observed interrelationships in the data, facilitate interpretation of complex relationships in large, multivariate data sets. Uses of factor analysis include discovering new concepts, confirming hypotheses about structuring of variables, and constructing indices to be used as new variables in later analysis.

Principal-component analysis uses defined factors, usually mathematical transformations of the original data, to construct a set of new variables on the basis of interrelations exhibited in the data.

Principal components are independent of each other. No particular assumptions are necessary about the underlying structure of the variables, it is only necessary to determine the best linear combinations.

The first principal component is considered the best summary of linear relationships exhibited in the data. The second component is defined as the second best linear combination of variables.

General principals of factor analysis and relevant references may be found in the SPSS (Statistical Package for the Social Sciences, 1975).

Figure 9:
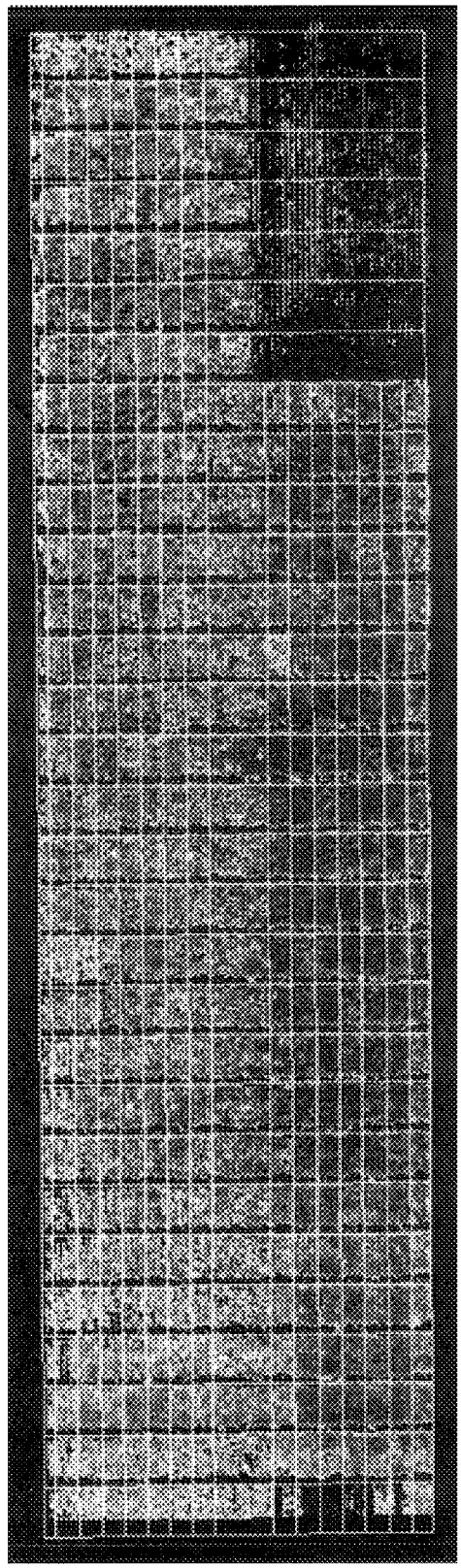
FIG. 9. is an image obtained from the same fields as in FIG. 5 showing a color composite resulting from principal components analysis.

FIG. 9 shows an image of a field after principal components analysis of remote sensing data obtained from plants in the field.

REFERENCES

The references listed below are incorporated herein by reference to the extent that they supplement, explain, provide a background for, or teach methodology, techniques, and/or compositions employed herein.

Ammon et al. (1987) *Am. Soc. Photogrammetry and Remote Sensing*, Falls Church, Va., pp. 244–251.

Baret and Guyot (1991) *Remote Sensing of Environment* 35: 161–171.

Beckmann, J. S. and Soller, M. (1983) "Restriction Fragment Length Polymorphisms in Genetic Improvement: Methodologies, Mapping and Costs," *Theor. Appl. Genet.* 67:35–43.

Beltsville Symposium XV, Remote Sensing for Agriculture, May 16–18 (1990) in *Remote Sensing of Environment*, v. 35 (1991).

Botstein, D., White, R., Skolnick, M., et al. (1980) "Construction of a Genetic Linkage Map in Man Using Restriction Fragment Length Polymorphisms," *Am. J. Hum. Genet.* 32: 314–331.

Carlson et al. (1991) *Remote Sensing of Environment*, 35: 175–185.

Cihlar et al. (1991) *Remote Sensing of Environment*, 35: 279–295.

Dhillion et al. (1990) *Crop Science* 30 (4): 931–936

East, E. M. (1915) *Genetics*, 164–176.

Engman (1991) *Remote Sensing of Environment*, 35: 213–225.

Everitt, J. H. et al. (1989) *Geocarto International*, 4: 39.

Everitt, J. H. et al. (1990) *Photogrammetric Engineering and Remote Sensing* 56 (No. 3): 343–349.

Everitt et al. (1990) *Remote Sensing of Environment*, 22: 423–428.

Everitt et al. (1991) *Remote Sensing of Environment*, 35: 231–241.

Falconer, D. S. (1960) "Introduction to Quantitative Genetics," Ronald Press Co., New York.

Fisher, R. A. (1918) "Correlation Between Relatives on the Supposition of Mendalian Inheritance." *Trans. Royal Soc. Edinburgh.* 52:399–433.

Gonzalez, R. C., Wintz, P. (1977) *Digital Image Processing*, Addison-Wesley, Redding, Mass.

Goward et al. (1991) *Remote Sensing of Environment*, 35: 257–274.

Gutman (1991) *Remote Sensing of Environment*, 35: 121–135.

Hall et al. (1991) *Remote Sensing of Environment*, 35: 187–198.

Hallauer, et al. (1988) "Corn Breeding-Testers and Testing," In: *Corn and Corn Improvement*, Sprague, G. F. and Dudley, J. W., eds., pp. 484–487.

Huete et al. (1991) *Remote Sensing of Environment*, 35: 149–159.

Jackson, R. D. (1983) *Remote Sens. Environ.* 13: 1401–1429.

Jia, J. et al. (1990) "Corn plant locating by image processing," *Optics in Agriculture* 1379: 246–253.

Johannsen, W. (1909) *Elements der Evokten Erbelichkeirsllehre*, Fishcher, Jena.

Kauth, R. J. and Thomas, G. S. (1976) in 10th Symposium on Machine Processing of Remotely Sensed Data, Purdue Univ. pp. 41–51.

Lande, R. and Thompson, R. (1990) "Efficiency of Marker-Associated Selection in the Improvement of Quantitative Traits," *Genetics* 124:743–756.

Lander, E. S. and Botstein, D. (1989) "Mapping Mendelian Factors Underlying Quantitative Traits Using RFLP Linkage Maps," *Genetics* 121:185–199, see also WO 90104651.

Loffler and Busch (1983) *Crop Science* 23 (1): 167–168.

Mather, K. and Jinks, J. L. (1971) *Biometrical Genetics*, Cornell Univ. Press, Ithaca, N.Y.

McKinney et al. (1989) *Crop Science* 29 (2): 255–259.

Nienhuis, J., Helentjaris, T., Slocum, M. (1987) "Restriction Fragment Length Polymorphism Analysis of Loci Associated with Insect Resistance in Tomato," *Crop Sci.* 27:797–803.

Nilsson-Ehle, H. (1909) "Kreuzungunter-schungen an Hafer und Weizen Lund."

Ranson et al. (1991) *Remote Sensing of Environment*, 35: 201–210.

Ross and Marshal (1989) *Remote Sensing of Environment*, 27 (3): 251–260.

Rouse et al. (1974) Monitoring the vernal advancement and retrogradation of natural vegetation. NASA/GSFC Type III Final Report, Greenbelt, MD p. 371.

Schmugge et al. (1991) *Remote Sensing of Environment*, 35: 95–103.

Sequin et al. (1991) *Remote Sensing of Environment*, 35: 141–147.

Smith, C. (1967) "Improvement of Metric Traits Through Specific Genetic Loci," *Anim. Pract.* 9:349–358.

Spomer and Smith (1989) *Agronomy Journal* 81 (6): 906–910.

Sprague, G. F. and Eberhart, S. A. (1977) "Corn Breeding," in *Corn and Corn Improvements*, J. A. Dudley and G. F. Sprague (eds), Iowa State Univ. Press.

Sprawl, P. 1988) *Physical Principles of Medical Imaging*, Aspen Publishers, Rockville, Md.

Stevens, M. D. et al. (1990) "High-Spectral Resolution Indices for Crop Stress", in *Applications of Remote Sensing in Agriculture*, M. D. Stevens and J. D. Clark.

Townsend et al. (1991) *Remote Sensing of Environment* 35: 243–253.

Valdes et al. (1990) *Canadian Journal of Plant Science* 70 (3): 747–755.

Valdes et al. (1987) *Canadian Journal of Animal Science* 67 (2): 557–562.

Verhoef, W. (1984) *Nat. Aerosapce Lab.*, The Netherlands 9: 1–30.

Wiegand et al. (1991) *Remote Sensing of Environment*, 35: 105–117.

Wiegand and Miller (1987) USDA 90:149–164.

Williams (1991) *Remote Sensing of Environment* 35: 79–92.

Wright, S., *Evolution and the Genetics of Populations*, vol. 1 (1968), vol. 5 (1977), Univ. of Chicago Press, Chicago.

Zhang and Brusewitz (1990) *Transactions of the ASAE* 33 (2): 553–936.

What is claimed is:

1. A method of plant breeding, the method comprising the steps of:
   a) essentially simultaneously obtaining a separate energy value for each of a plurality of genotypes of said plant using remote sensing of said genotypes;
   b) performing operations on said energy value to define a descriptor of a phenotypic trait in said genotypes;
   c) using said descriptor to compare the values of said phenotypic trait among a plurality of said genotypes;
   d) identifying from said genotypes a genotype that displays a preferred value of said phenotypic trait relative to a second genotype to which the identified genotype was compared; and
   e) selecting said identified genotype and
      (i) crossing plants of said identified genotype with the same genotype or a second genotype for purposes of plant breeding; or
      (ii) growing plants of said identified genotype for further evaluation of phenotypic trait performance.

2. The method of claim 1 wherein the energy values comprise those produced by reflectance of active or passive electromagnetic radiation by the plants.

3. The method of claim 2 wherein the energy values are further defined as recorded by multispectral color-infrared photometry.

4. The method of claim 3 wherein the recorded energy values comprise a descriptor predictive of photosynthetic activity of the plants.

5. The method of claim 3 wherein the recorded energy values comprise a descriptor predictive of plant morphological response to an environment.

6. The method of claim 5 wherein the plant morphological response to an environment comprises leaf rolling.

7. The method of claim 1, wherein the descriptor of a first phenotype of the plants comprises a descriptor used to predict a second phenotype of the plants.

8. The method of claim 7 wherein the second phenotype is yield.

9. The method of claim 1 wherein the energy values comprise those produced by emission of electromagnetic radiation by the plants.

10. The method of claim 9 wherein the energy values are further defined as comprising thermal output of a canopy formed by the plurality of plants.

11. The method of claim 10 wherein the thermal output of the plant canopy comprises a descriptor predictive of photosynthetic activity of the plants.

12. The method of claim 10 wherein the thermal output of the plant canopy comprises a descriptor predictive of plant morphological response to an environment.

13. The method of claim 12 wherein the plant morphological response to an environment comprises leaf rolling.

14. The method of claim 10 wherein the thermal output of the plant canopy comprises a descriptor predictive of plant water status.

15. The method of claim 1 wherein an image of energy values is obtained by video technology.

16. The method of claim 15 wherein the video technology comprises video systems for multispectral reflectance recording.

17. The method of claim 1 wherein the image comprises an image obtained by remote sensing using aerial surveillance of the plants.

18. The method of claim 1 wherein the plants comprise corn plants.

19. The method of claim 18 wherein the corn plants comprise hybrid plants.

20. The method of claim 18 wherein the corn plants comprise segregating offspring populations produced by self-fertilization of hybrid plants.

21. The method of claim 1 wherein the plants comprise sorghum plants.

22. The method of claim 1 wherein the plants comprise soybean plants.

23. The method of claim 1 wherein the operations performed on an image comprise digitization and image enhancement.

24. The method of claim 23 wherein the operations are further defined as comprising factor analysis of the digitized values of the image.

25. The method of claim 24 wherein the factors analyzed comprise principal components of the digitized values.

26. The method of claim 23 wherein the operations are further defined as comprising determining the standard deviations of the factors of the digitized values of the image.

27. The method of claim 26 wherein the factors are principal components.

28. The method of claim 26 wherein the standard deviations are predictive of yield.

29. The method of claim 1 wherein the plants are growing in a field.

30. The method of claim 29 wherein the field is divided into subplots.

31. The method of claim 30 wherein the subplots comprise plants of different genotypes.

32. The method of claim 1 further comprising selecting certain classes of plants for subsequent breeding.

33. The method of claim 32 wherein the gametes of the plants selected are used for subsequent breeding.

34. The method of claim 33 further comprising a comparison of the phenotypes of the different genotypes.

35. The method of claim 1 wherein the defined phenotypic trait is stress response.

36. The method of claim 35 wherein the stress responded to comprises different levels of water availability.

37. The method of claim 35 wherein the stress responded to comprises different levels of temperature.

38. The method of claim 1 wherein the phenotypic trait is resistance to insects.

39. The method of claim 38 wherein the insects comprise European corn borer or rootworm.

40. The method of claim 1 wherein the phenotypic trait is disease resistance.

41. The method of claim 40 wherein disease resistance is further defined as comprising resistance to fungal, viral, or bacteria plant diseases.

42. The method of claim 1 wherein the defined phenotypic trait is the response of said identified genotype to environmental change.

43. The method of claim 1 wherein the defined phenotypic trait is yield.

44. The method of claim 1 wherein the defined phenotypic trait is wide area adaptability of genotypes.

45. The method of claim 1 wherein the defined phenotypic trait is drought resistance.

46. The method of claim 1 where the defined phenotypic trait is yield stability.

47. The method of claim 1 wherein said genotypes are selected based on genetic improvement.

48. The method of claim 1 wherein said identified genotype is crossed with the same genotype or a second genotype for purposes of plant breeding.

49. The method of claim 1 wherein said identified genotype is grown for further evaluation of phenotypic trait performance.

50. A method for selecting *Zea mays* plants for cultivar development based on predicting genotype contribution to the value of a defined phenotypic trait in a plant genotype at a given generation, said method comprising the steps of:
 a) essentially simultaneously obtaining an energy value by remote sensing of said plant genotype at a generation different than said given generation;
 b) performing operations on said energy value to develop a quantitative descriptor of a phenotypic trait in said plant genotype;
 c) using said descriptor to predict the contribution of said genotype to said defined phenotypic trait at said given generation; and
 d) selecting a genotype based on said prediction and
  (i) crossing plants of said identified genotype with the same genotype or a second genotype for purposes of plant breeding; or
  (ii) growing plants of said desired genotype for further evaluation of phenotypic trait performance.

51. The method of claim 1 wherein the defined phenotypic trait is herbicide resistance.

* * * * *